United States Patent
Kanno

(10) Patent No.: US 10,050,333 B2
(45) Date of Patent: Aug. 14, 2018

(54) RECEPTION DEVICE AND CONTROL METHOD THEREFOR

(71) Applicant: Dexerials Corporation, Shinagawa-ku, Tokyo (JP)

(72) Inventor: Masayoshi Kanno, Tokyo (JP)

(73) Assignee: Dexerials Corporation, Shinagawa-ku, Tokyo (JP)

( * ) Notice: Subject to any disclaimer, the term of this patent is extended or adjusted under 35 U.S.C. 154(b) by 226 days.

(21) Appl. No.: 15/254,120

(22) Filed: Sep. 1, 2016

(65) Prior Publication Data

US 2017/0069957 A1    Mar. 9, 2017

(30) Foreign Application Priority Data

Sep. 7, 2015 (JP) ................. 2015-176136

(51) Int. Cl.
*H01Q 1/24* (2006.01)
*H01Q 5/10* (2015.01)
*H04B 5/00* (2006.01)

(52) U.S. Cl.
CPC ............ *H01Q 1/243* (2013.01); *H01Q 5/10* (2015.01); *H04B 5/0037* (2013.01)

(58) Field of Classification Search
CPC .............................. H01Q 1/243; H01Q 5/10
USPC ....................................................... 343/702
See application file for complete search history.

(56) References Cited

FOREIGN PATENT DOCUMENTS

| JP | H05128319 A | 5/1993 |
|---|---|---|
| JP | 4382063 B2 | 12/2009 |
| JP | 2011024101 A | 2/2011 |
| JP | 2013058170 A | 3/2013 |

*Primary Examiner* — Graham Smith
(74) *Attorney, Agent, or Firm* — Kenja IP Law PC

(57) ABSTRACT

Provided is a reception device (20) including: an antenna section (21) that includes a resonant circuit (212) including an antenna (211) that is configured to receive electrical power from a transmission device (10) through contactless communication; and a control section (31) that is configured to change a Q factor of the resonant circuit (212) and control an antenna characteristic of the antenna section (21) in accordance with a change in received electrical power before and after changing of the Q factor.

14 Claims, 13 Drawing Sheets

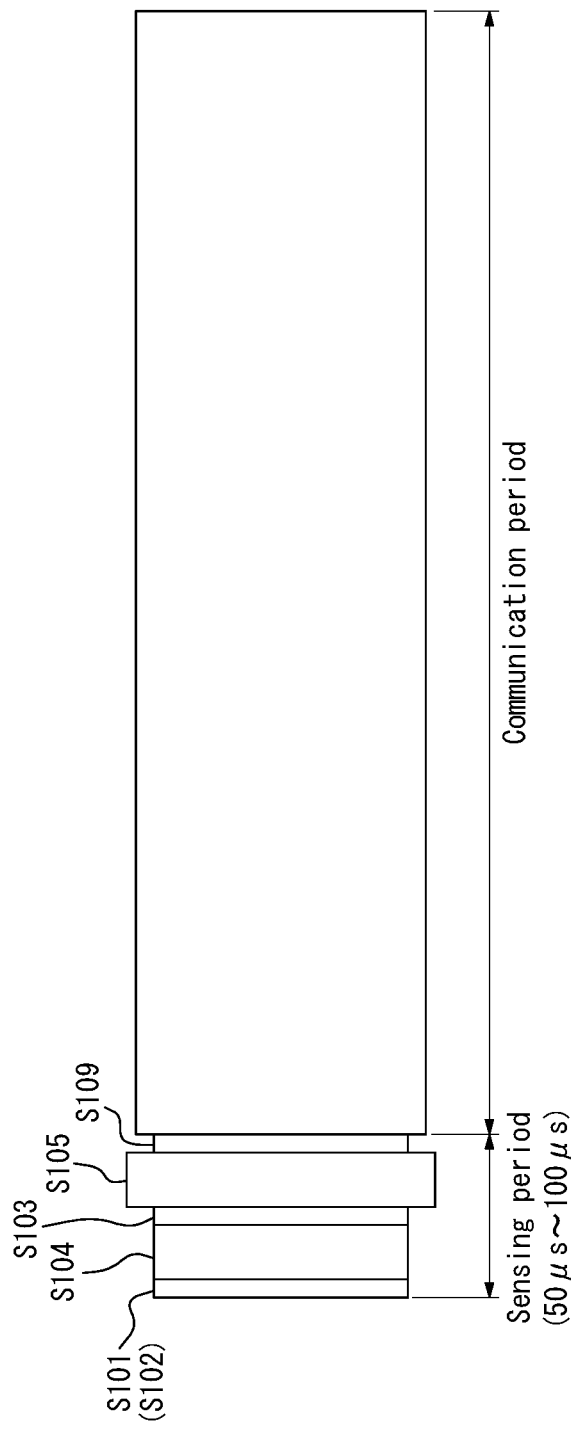

RECEPTION DEVICE AND CONTROL METHOD THEREFOR

CROSS-REFERENCE TO RELATED APPLICATION

The present application claims priority of Japanese Patent Application No. 2015-176136 filed on Sep. 7, 2015, the entire disclosure of which is incorporated herein by reference.

TECHNICAL FIELD

The present disclosure relates to a reception device that receives electrical power from a transmission device through contactless communication and to a control method for this reception device.

BACKGROUND

In recent years, the spread of contactless communication systems using contactless communication techniques such as NFC (Near Field Communication) and FeliCa (FeliCa is a registered trademark in Japan, other countries, or both) has been remarkable. In a contactless communication system such as mentioned above, communication (i.e., transfer of data or electrical power) is performed through magnetic field coupling of a coil antenna incorporated into a transmission device (R/W (Reader/Writer) device) and a coil antenna incorporated into a reception device (card-type/tag-type).

In a generally known technique for enabling a longer communication distance between a transmission device and a reception device through use of electromagnetic induction, antennas of the transmission device and the reception device are each a resonant antenna (resonant circuit) in which a resonant capacitor is connected to a coil antenna. This technique is also being used for wireless power supply, the specifications of which are drawn up by standardizing bodies such as the WPC (Wireless Power Consortium) and the PMA (Power Matters Alliance).

The magnitude of magnetic coupling (coupling coefficient k) between coil antennas of a transmission device and a reception device changes depending on the distance between the antennas and the size of the antennas in these devices. As explained above, communication between the transmission device and the reception device is through magnetic coupling of the coil antennas in these devices and, as a consequence, a change in the coupling coefficient k leads to a change in communication characteristics.

PTL 1 discloses a technique in which an R/W device (transmission device) monitors information pertaining to current flowing in a coil antenna of a transmission section while transmitting a signal from the transmission section, determines a transmission state based on the monitored information, and adjusts communication characteristics of the transmission section based on the communication state that is determined.

PTL 1 discloses that when the current flowing in the coil antenna in a situation in which the R/W device is used by itself is taken to be a value of 1, placing a contactless IC card (reception device) in opposition to the R/W device leads to a decrease in the current flowing in the coil antenna of the R/W device. Furthermore, PTL 1 discloses that there is a correlation between the percentage decrease in the current flowing in the coil antenna and the distance between the R/W device and the contactless IC card. PTL 1 also discloses that the voltage induced in the contactless IC card (induced voltage) increases in accompaniment to a decrease in the current flowing in the coil antenna of the R/W device when a relative value of the current flowing in the coil antenna of the R/W device is from 1 to 0.5, that the induced voltage is at a maximum when the relative value is 0.5, and that the induced voltage decreases when the relative value becomes smaller than 0.5.

The decrease in the current flowing in the coil antenna of the R/W device is not dependent on the antenna size or the Q factor of a resonant circuit. In the technique disclosed in PTL 1, the communication state (i.e., whether the communication distance is a long distance, a medium distance, a short distance, or close contact) is determined based on the information pertaining to the current flowing in the coil antenna. Furthermore, in the technique disclosed in PTL 1, the communication characteristics of the transmission section (for example, the resonant frequency and the Q factor of the resonant circuit) are adjusted based on the communication state that is determined in order to optimize the communication characteristics of the transmission section in accordance with the communication state and enable stable communication.

PTL 2 discloses a technique in which a characteristic of a resonant circuit (capacitance of the resonant circuit) that is included in a contactless IC card (reception device) in order to perform contactless communication with an R/W device (transmission device) is changed in accordance with an induced voltage in the contactless IC card.

PTL 3 discloses a technique in which the resonant frequency of a resonant circuit section that is included in an information processing terminal (reception device) in order to perform contactless communication with a reading and writing device (transmission device) is changed in accordance with a reference voltage and an induced voltage in the information processing terminal.

The techniques disclosed in PTL 2 and PTL 3 enable improvement of communication characteristics through changing of a characteristic of a resonant circuit in a reception device in accordance with an induced voltage in the reception device.

PTL 4 discloses a technique in which, in an information processing device (transmission device) including a communication antenna for performing contactless communication and in which either or both of a Q factor and a tuning frequency are variable, the distance between the information processing device and a communication device (reception device), such as an IC card, is estimated by detecting a voltage applied to the communication antenna and comparing the detected voltage to a threshold value, and the Q factor and/or the tuning frequency of the communication antenna is set in accordance with a result of the estimation.

When a transmission device and a reception device become too close, this generally causes tight coupling of an antenna of the transmission device and an antenna of the reception device, which may decrease a modulation factor and lead to communication failure. In the technique disclosed in PTL 4, when the voltage applied to the communication antenna falls below the threshold value, it is determined that the information processing device and the communication device have become too close, and the Q factor and/or the tuning frequency of the communication antenna is controlled such as to inhibit communication failure.

CITATION LIST

Patent Literature

PTL 1: JP 2013-58170 A
PTL 2: JP H05-128319 A

PTL 3: JP 4382063 B2
PTL 4: JP 2011-024101 A

SUMMARY

As explained above, in the technique disclosed in PTL 1, the transmission device transmits a signal while monitoring information pertaining to current flowing in the coil antenna and adjusting communication characteristics of the transmission section. However, the technique disclosed in PTL 1 cannot be applied to a reception device because a reception device itself is unable to transmit a signal.

The techniques disclosed in PTL 2 and PTL 3 each involve changing a characteristic of a resonant circuit in accordance with an induced voltage in a reception device. As explained above, the induced voltage is related to the communication distance in terms that the induced voltage increases as the transmission device and the reception device move closer together, and after reaching a maximum at a certain communication distance, the induced voltage decreases as the transmission device and the reception device move even closer together. Therefore, these techniques suffer from a problem of not being able to sufficiently improve communication characteristics simply by changing the characteristic of the resonant circuit in accordance with a detected value of the induced voltage.

Moreover, the technique disclosed in PTL 4 merely involves determining whether or not a transmission device and a reception device are too close and cannot be used for optimally controlling an antenna characteristic in accordance with communication distance.

In light of the various problems described above, an objective of the present disclosure is to provide a reception device and a control method therefor that enable improvement of communication characteristics through control of an antenna characteristic in accordance with communication distance.

In order to solve the aforementioned problems, a reception device according to the present disclosure comprises: an antenna section that includes a resonant circuit including an antenna configured to receive electrical power from a transmission device through contactless communication; and a control section that is configured to change a Q factor of the resonant circuit and control an antenna characteristic of the antenna section in accordance with a change in received electrical power before and after changing of the Q factor.

In the reception device according to the present disclosure, the control section preferably changes the Q factor of the resonant circuit by changing a resistance value of a resistance that is electrically connected to the antenna.

In the reception device according to the present disclosure, the control section preferably changes the Q factor of the resonant circuit from a first Q factor to a second Q factor and controls the antenna characteristic of the antenna section in accordance with polarity of a difference between first received electrical power that is electrical power received when the Q factor of the resonant circuit is the first Q factor and second received electrical power that is electrical power received when the Q factor of the resonant circuit is the second Q factor.

In the reception device according to the present disclosure, the first Q factor is preferably a specific value that is set when the reception device and the transmission device perform contactless communication, and the second Q factor is preferably larger than the first Q factor.

In the reception device according to the present disclosure, when the difference between the first received electrical power and the second received electrical power is a positive value, the control section preferably controls the antenna characteristic of the antenna section such as to become an antenna characteristic that is suitable for a situation in which a communication distance between the transmission device and the reception device is a first distance, and when the difference between the first received electrical power and the second received electrical power is a non-positive value, the control section preferably controls the antenna characteristic of the antenna section such as to become an antenna characteristic that is suitable for a situation in which the communication distance is a second distance that is shorter than the first distance.

In the reception device according to the present disclosure, when the difference between the first received electrical power and the second received electrical power is a non-positive value, and is greater than a specific threshold value that is a negative value, the control section preferably controls the antenna characteristic of the antenna section such as to become an antenna characteristic that is suitable for a situation in which the communication distance is a third distance that is shorter than the first distance and longer than the second distance.

In the reception device according to the present disclosure, the control section preferably changes the resistance value of the resistance such that a difference between received electrical power before and after changing of the Q factor becomes a non-positive value, and becomes greater than a specific threshold value that is a negative value.

Furthermore, in order to solve the aforementioned problems, a reception device control method according to the present disclosure, which is a control method for a reception device including an antenna section that includes a resonant circuit including an antenna configured to receive electrical power from a transmission device through contactless communication, comprises: changing a Q factor of the resonant circuit; and controlling an antenna characteristic of the antenna section in accordance with a change in received electrical power before and after changing of the Q factor.

In the reception device control method according to the present disclosure, in the controlling, the Q factor of the resonant circuit is preferably changed by changing a resistance value of a resistance that is electrically connected to the antenna.

In the reception device control method according to the present disclosure, in the controlling, the Q factor of the resonant circuit is preferably changed from a first Q factor to a second Q factor and the antenna characteristic of the antenna section is preferably controlled in accordance with polarity of a difference between first received electrical power that is electrical power received when the Q factor of the resonant circuit is the first Q factor and second received electrical power that is electrical power received when the Q factor of the resonant circuit is the second Q factor.

In the reception device control method according to the present disclosure, the first Q factor is preferably a specific value that is set when the reception device and the transmission device perform contactless communication, and the second Q factor is preferably larger than the first Q factor.

In the reception device control method according to the present disclosure, in the controlling, when the difference between the first received electrical power and the second received electrical power is a positive value, the antenna characteristic of the antenna section is preferably controlled such as to become an antenna characteristic that is suitable for a situation in which a communication distance between the transmission device and the reception device is a first distance, and when the difference between the first received electrical power and the second received electrical power is a non-positive value, the antenna characteristic of the antenna section is preferably controlled such as to become an antenna characteristic that is suitable for a situation in which the communication distance is a second distance that is shorter than the first distance.

In the reception device control method according to the present disclosure, in the controlling, when the difference between the first received electrical power and the second received electrical power is a non-positive value, and is greater than a specific threshold value that is a negative value, the antenna characteristic of the antenna section is preferably controlled such as to become an antenna characteristic that is suitable for a situation in which the communication distance is a third distance that is shorter than the first distance and longer than the second distance.

In the reception device control method according to the present disclosure, in the controlling, the resistance value of the resistance is preferably changed such that a difference between received electrical power before and after changing of the Q factor becomes a non-positive value, and becomes greater than a specific threshold value that is a negative value.

The reception device and the control method therefor according to the present disclosure enable improvement of communication characteristics through control of the antenna characteristic in accordance with the communication distance.

BRIEF DESCRIPTION OF THE DRAWINGS

In the accompanying drawings:

FIG. 13 is a timing chart for a received signal at an RX terminal illustrated in FIG. 3.

DETAILED DESCRIPTION

The following describes embodiments of the present disclosure with reference to the drawings. It should be noted that the present disclosure is not limited to only the following embodiments and various alterations can of course be made to the extent that such alterations do not deviate from the essence of the present disclosure.

Figure 1:
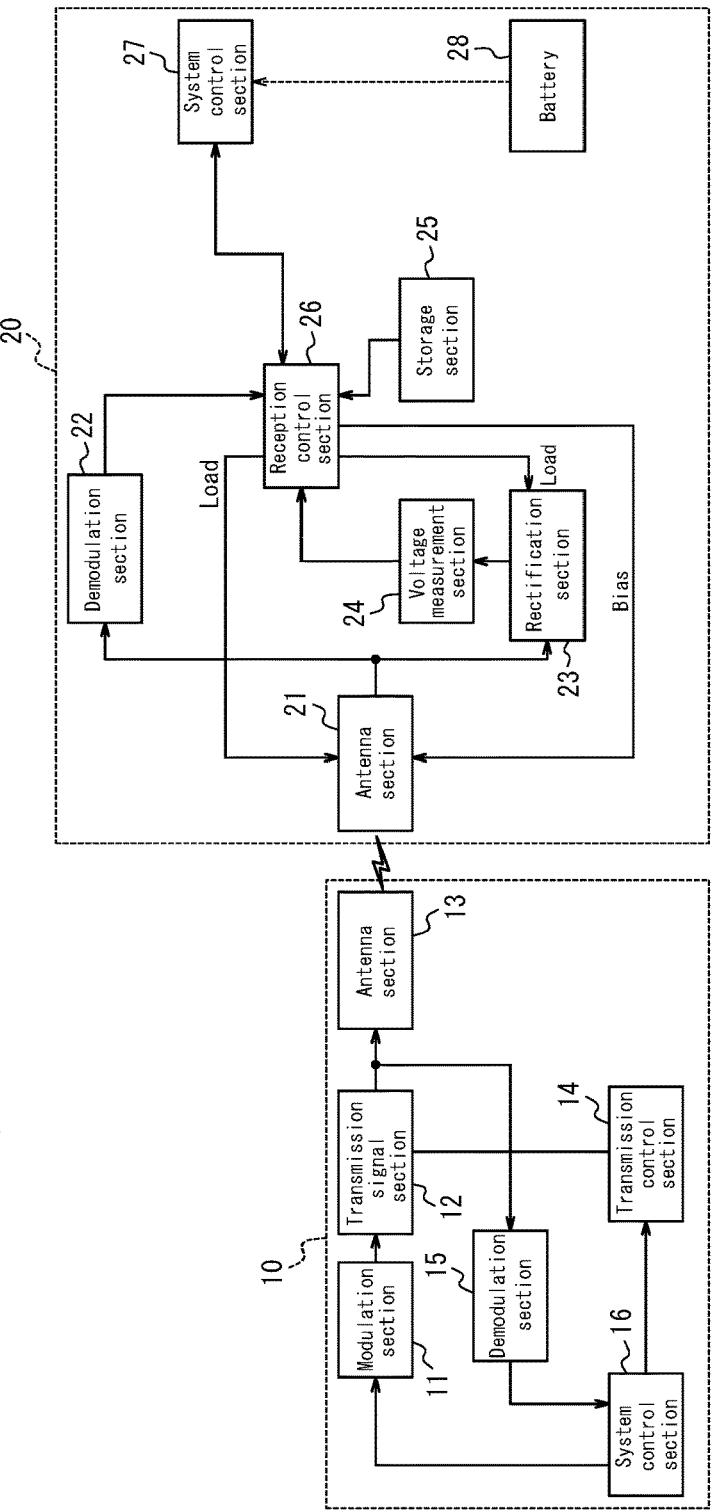
FIG. 1 illustrates an example of configuration of a contactless communication system according to one embodiment of the present disclosure.

FIG. 1 illustrates an example of configuration of a contactless communication system 1 according to one embodiment of the present disclosure. The contactless communication system 1 according to the present embodiment is applicable to a system that performs transfer of data through contactless communication using magnetic coupling or a system that performs contactless power supply defined, for example, by the Qi standard released by the WPC. In FIG. 1, wiring related to input and output of information between blocks is indicated by solid arrows and wiring related to electrical power supply is indicated by dashed arrows.

The contactless communication system 1 illustrated in FIG. 1 is a transmission and reception system that includes a transmission device 10 and reception device 20, and that performs transfer of data between the transmission device 10 and the reception device 20 through contactless communication.

The transmission device 10 is an R/W device that has functions of reading data from the reception device 20 and writing data into the reception device 20 through contactless communication. The reception device 20 is a device that operates in what is referred to as a "card mode" in which the reception device 20 receives data from the transmission device 10 and operates in accordance with the received data. Specific examples of the reception device 20 include a contactless IC card, an IC tag, and an electronic device such as a mobile telephone or smartphone equipped with a contactless communication function.

The following explains configuration of the transmission device 10 and the reception device 20.

First, configuration of the transmission device 10 is explained.

The transmission device 10 illustrated in FIG. 1 includes a modulation section 11, a transmission signal section 12, an antenna section 13, a transmission control section 14, a demodulation section 15, and a system control section 16.

The modulation section 11 is configured to modulate a carrier signal of a specific carrier frequency (for example, 13.56 MHz) using transmission data output from the system control section 16 and output the modulated carrier signal to the transmission signal section 12.

The transmission signal section 12 is configured to output, to the antenna section 13, a carrier signal that is output from the modulation section 11.

The antenna section 13 includes a resonant circuit (not illustrated) including an antenna coil and a resonant capacitor, and is configured to transmit a signal (data) to the reception device 20 in accordance with output from the transmission signal section 12, through contactless communication using magnetic coupling. Moreover, the antenna section 13 is configured to receive a signal from the reception device 20 and output the received signal to the demodulation section 15.

The transmission control section 14 is configured to generate a signal for adjusting the resonant frequency of the resonant circuit in the antenna section 13 and output the generated signal to the transmission signal section 12 under the control of the system control section 16. The transmission signal section 12 is configured to adjust the resonant frequency of the resonant circuit in the antenna section 13 in accordance with an output signal from the transmission control section 14.

The demodulation section 15 is configured to demodulate a signal (received signal) output from the antenna section 13 and output the demodulated signal to the system control section 16. More specifically, a signal that is transmitted to the reception device 20 by the transmission signal section 12 via the antenna section 13 is modulated by load modulation in the reception device 20 and the modulated signal is transmitted to the transmission device 10. The signal from the reception device 20 is received by the antenna section 13, and the received signal of the antenna section 13 is demodulated and output to the system control section 16 by the demodulation section 15.

The system control section 16 is configured to control overall operation of the transmission device 10. For example, the system control section 16 is configured to generate transmission data corresponding to a command signal from an external source and output the generated transmission data to the modulation section 11. Moreover, the system control section 16 is configured to control the modulation section 11 and the transmission control section 14 in accordance with a command from an external source, an internal program, or the like. Furthermore, the system control section 16 is configured to perform specific processing, such as transmission or reception of data with an external destination or source, in accordance with a signal output from the demodulation section 15.

Next, configuration of the reception device 20 is explained.

The reception device 20 illustrated in FIG. 1 includes an antenna section 21, a demodulation section 22, a rectification section 23, a voltage measurement section 24, a storage section 25, a reception control section 26, a system control section 27, and a battery 28.

The antenna section 21 includes a resonant circuit (not illustrated in FIG. 1) that includes an antenna coil (antenna) and a resonant capacitor, and is configured to receive a signal transmitted from the transmission device 10 through contactless communication using magnetic coupling. The antenna section 21 is configured to output a received signal to the demodulation section 22 and the rectification section 23. Moreover, the antenna section 21 is configured to transmit a signal to the transmission device 10 under the control of the reception control section 26.

The demodulation section 22 is configured to demodulate a signal output from the antenna section 21 and output the demodulated signal to the reception control section 26.

The rectification section 23 is for example a rectifying circuit including a rectifying diode and a rectifying capacitor. The rectification section 23 is configured to rectify a signal received by the antenna section 21 (alternating current electrical power) to direct current electrical power and output the direct current electrical power to the voltage measurement section 24.

The voltage measurement section 24 is configured to measure the voltage (induced voltage) of a signal output from the rectification section 23 (direct current signal) and output a result of the measurement to the reception control section 26.

The storage section 25 is configured to store, for example, setting values for controlling an antenna characteristic of the antenna section 21 (resonant frequency or Q factor of the resonant circuit) in accordance with the distance between the transmission device 10 and the reception device 20 (communication distance).

The reception control section 26 is configured to estimate the communication distance and control the antenna characteristic of the antenna section 21 (frequency characteristic or Q factor of the resonant circuit) in accordance with the estimated communication distance, in order to optimize the antenna characteristic of the antenna section 21 during communication.

Specifically, the reception control section 26 is configured to output a "Load" signal to a resistance (load resistance) not illustrated in FIG. 1 that is connected to the rectification section 23 (rectifying circuit) in order to change a resistance value of the load resistance, and is configured to estimate the communication distance in accordance with a change in received electrical power before and after changing of the resistance value. Changing of the resistance value of the resistance (load resistance) connected to the rectification section 23 leads to a change in the Q factor of the resonant circuit in the antenna section 21 as described in detail further below. The reception control section 26 is configured to change the Q factor of the resonant circuit in the antenna section 21 and estimate the communication distance in accordance with a change in received electrical power before and after changing of the Q factor. Note that the reception control section 26 is configured to calculate the received electrical power based on the induced voltage measured by the voltage measurement section 24 and the resistance value of the load resistance.

Moreover, the reception control section 26 is configured to output a control voltage "Bias" to the antenna section 21 for controlling the capacitance of a variable-capacitance capacitor in the antenna section 21 in accordance with a setting value stored by the storage section 25 that corresponds to the estimated communication distance. Changing of the capacitance of the variable-capacitance capacitor in the antenna section 21 leads to a change in the resonant frequency of the resonant circuit. Furthermore, the reception control section 26 is configured to change the Q factor of the resonant circuit by changing a resistance value of a resistance that is electrically connected to the antenna of the antenna section 21.

Note that during estimation of the communication distance described above, the reception control section 26 may output a "Load" signal to the antenna section 21 as necessary in order to change the resistance value of a resistance connected to the antenna of the antenna section 21.

Furthermore, the reception control section 26 is configured to output, to the system control section 27, a signal output from the demodulation section 22. Moreover, the reception control section 26 is configured to cause the antenna section 21, under the control of the system control section 27, to transmit a response signal for a signal that is transmitted from the transmission device 10. Transmission of the response signal by the antenna section 21 is performed through load modulation by changing the resistance value of a resistance that is electrically connected to the antenna of the antenna section 21.

The system control section 27 is configured to perform processing as necessary in accordance with content of a signal output by the reception control section 26. Moreover, the system control section 27 is configured to control the reception control section 26 in accordance with a command from an external source, an internal program, or the like.

The battery 28 is configured to supply electrical power to the system control section 27 for operating the system control section 27.

Figure 2:
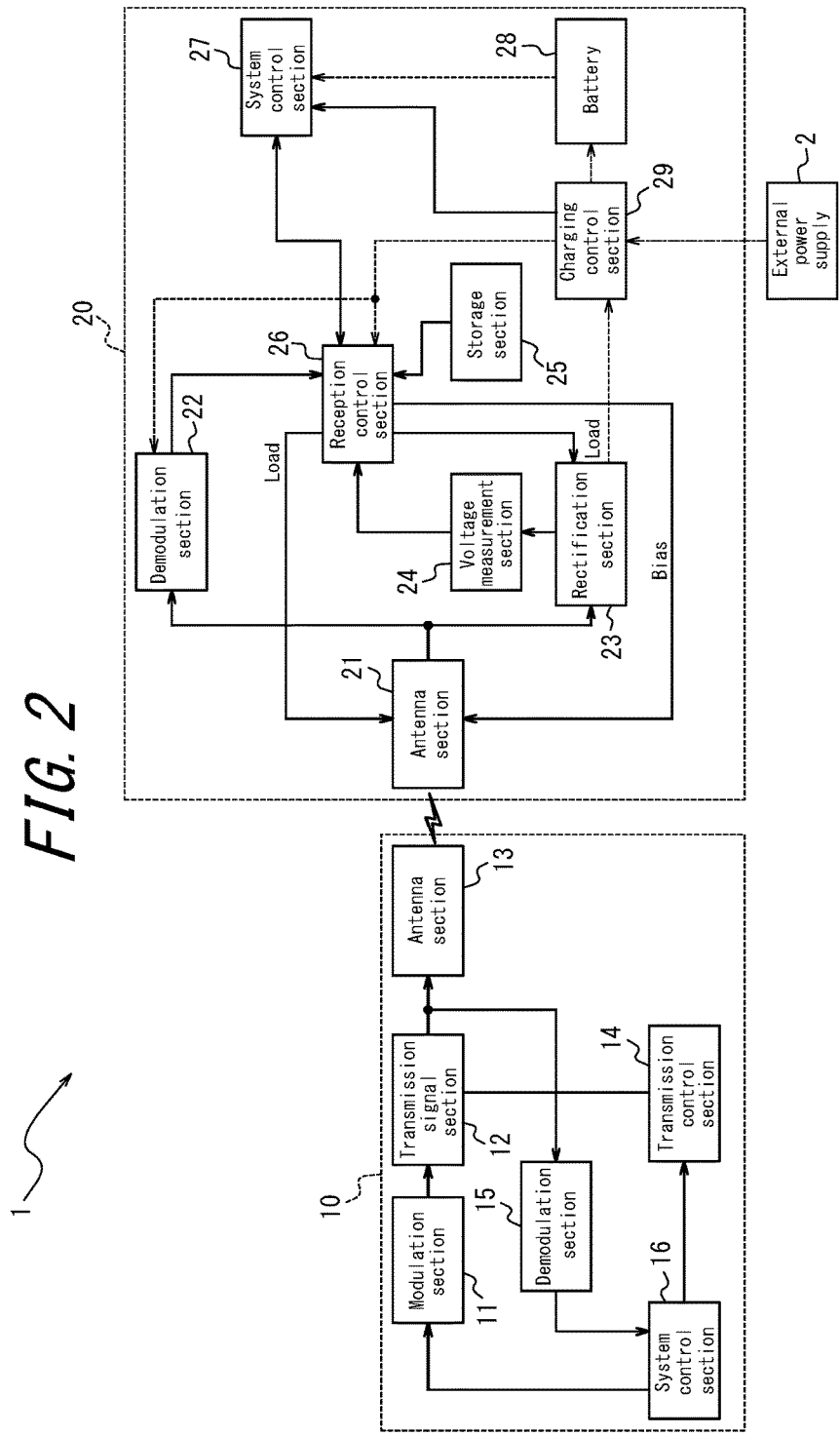
FIG. 2 illustrates another example of configuration of a contactless communication system according to one embodiment of the present disclosure.

The contactless communication system 1 illustrated in FIG. 1 has been explained for an example in which the contactless communication system 1 is a transmission and reception system that performs transfer of data between the transmission device 10 and the reception device 20. However, the contactless communication system 1 is not limited to this example. As explained above, the contactless communication system 1 can also be applied to a system that performs contactless power supply. The following explains, with reference to FIG. 2, an example of configuration for a situation in which the contactless communication system 1 is a contactless power supply system that performs contactless power supply from the transmission device 10 to the reception device 20. In FIG. 2, wiring related to input and output of information between blocks is indicated by solid arrows and wiring related to electrical power supply is indicated by dashed arrows.

The contactless communication system 1 performs transfer of data between the transmission device 10 and the reception device 20 even in a situation in which the contactless communication system 1 is a contactless power supply system and is, therefore, the same as the contactless communication system 1 illustrated in FIG. 1 in this aspect. Accordingly, elements of configuration that are the same as in FIG. 1 are denoted by the same reference signs in FIG. 2 and explanation thereof is omitted. However, there are differences between the contactless communication system 1 illustrated in FIG. 1 and the contactless communication system 1 illustrated in FIG. 2 in terms of the frequency, voltage, current, and so forth that are used. This is due to differences in setting conditions for achieving the respective functions of these systems.

The contactless communication system 1 illustrated in FIG. 2 differs from the contactless communication system 1 illustrated in FIG. 1 in terms that the reception device 20 additionally includes a charging control section 29.

The charging control section 29 is configured to receive a supply of electrical power (direct current electrical power) from an external power supply 2 or the rectification section 23 and use the supplied electrical power to, for example, charge the battery 28 and supply electrical power to the demodulation section 22, the reception control section 26, and so forth. The charging control section 29 is configured to output a mode signal to the system control section 27 in order to differentiate between a mode in which the charging control section 29 receives electrical power supply from the external power supply 2 and a mode in which the charging control section 29 receives electrical power supply from the rectification section 23.

No specific limitations are placed on the power supply format of the contactless communication system 1 illustrated in FIG. 2 and a format such as electromagnetic induction or magnetic resonance may be adopted. For example, in a situation in which the power supply format is an electromagnetic induction format that is known as Qi format, power supply is performed by placing the reception device 20 (for example, a mobile telephone device) on the transmission device 10 (for example, a power supply transmission pad). The communication distance is roughly fixed in this situation so long as the position at which the reception device 20 is placed on the transmission device 10 is roughly fixed. However, the transmission device 10 and the reception device 20 normally each include a resonant circuit for contactless communication and a shift in resonant frequency may occur in accordance with a shift in the placement position or with the model of the device to which power is supplied.

Specifically, in order that the antenna section 13 of the transmission device 10 (primary side antenna section) and the antenna section 21 of the reception device 20 (secondary side antenna section) can perform efficient transfer, the resonant frequencies of the resonant circuits are normally adjusted such as to resonate at the carrier frequency. Energy efficiently is normally determined by multiplying the coupling coefficient k of electromagnetic inductive coupling and the Q factor of an antenna, which means that it is preferable for k and the Q factor to be large. However, in a situation in which the Q factor of a resonant circuit is large, it is necessary to use high-precision components or perform resonant frequency adjustment because a large shift in the resonant frequency occurs due to constant value variation.

Therefore, even in the contactless communication system 1 illustrated in FIG. 2, it is necessary to control the antenna characteristic of the antenna section 21 in the reception device 20 in accordance with the communication distance in order to improve communication characteristics.

It should be noted that in contactless communication, communication is normally performed by arranging a plane in which the antenna of the transmission device 10 is positioned and a plane in which the antenna of the reception device 20 is positioned in opposition to one another. When a direction in which the transmission device 10 and the reception device 20 oppose one another is taken to be a Z direction and directions perpendicular to the Z direction are taken to be an X direction and a Y direction, it is not only separation in the Z direction between the center of the antenna coil of the transmission device 10 and the center of the antenna coil of the reception device 20 influences communication characteristics, but also separation in the X direction and separation in the Y direction. Therefore, the communication distance in the present embodiment refers to the distance between a position in the X, Y, and Z directions of the center of the antenna coil of the transmission device 10 and a position in the X, Y, and Z directions of the center of the antenna coil of the reception device 20.

As explained above, in the case of contactless power supply, the reception device 20 is placed on the transmission device 10 and, as a result, the distance in the Z direction is the same for reception devices 20 that are of the same model. However, since the communication distance changes if the placement position of the reception device 20 shifts in the X direction or the Y direction, it is necessary to control the antenna characteristic of the reception device 20 in accordance with the communication distance as described above.

Figure 3:
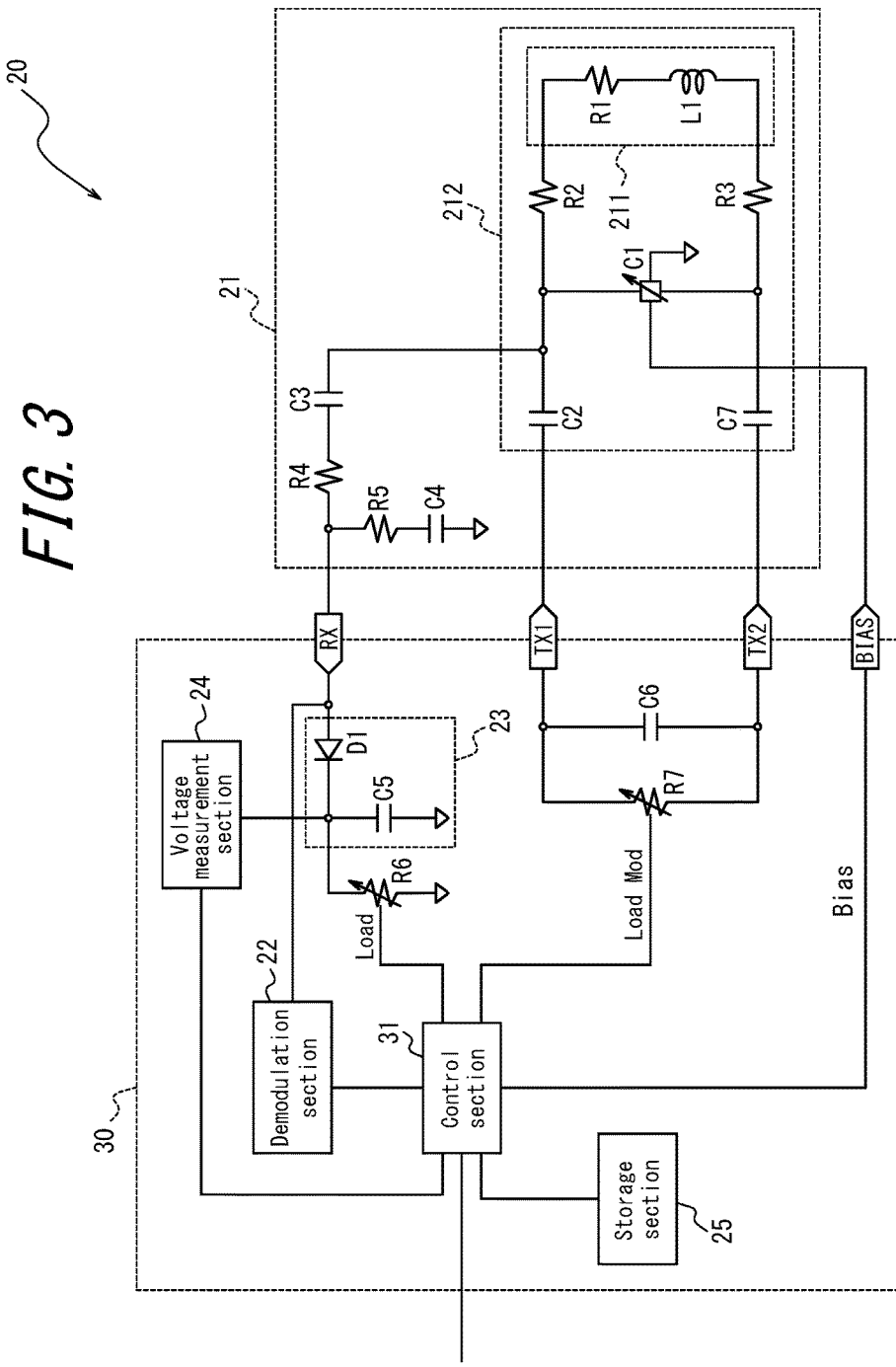
FIG. 3 illustrates, in more detail, an example of configuration of a reception device illustrated in FIGS. 1 and 2.

FIG. 3 illustrates an example of configuration of the reception device 20 in more detail. FIG. 3 illustrates an example of configuration for a situation in which the reception device 20 is a smartphone including an NFC LSI (Large Scale Integration) for mobile use. It should be noted that among the elements of configuration of the reception device 20 illustrated in each of FIGS. 1 and 2, those elements of configuration that are not directly related to the present disclosure, such as the battery 28 and the charging control section 29, are omitted in FIG. 3.

The reception device 20 illustrated in FIG. 3 includes the antenna section 21 and an LSI 30.

The antenna section 21 includes an antenna coil L1, resistances R1 to R5, a variable-capacitance capacitor C1, and fixed-capacitance capacitors C2 to C4 and C7.

The antenna coil L1 forms an antenna 211. The resistance R1 indicates internal resistance of the antenna coil L1. Note that although the resistance R1 does not actually exist as a component, the resistance R1 is illustrated in the circuit diagram in FIG. 3 since the resistance R1 is necessary for calculation. The reason for this is that the resistance R1 determines a Q factor of the antenna coil L1 (antenna 211). Accordingly, one end of the antenna coil L1 is connected to one end of the resistance R2 and the other end of the antenna coil L1 is connected to one end of the resistance R3.

The one end of the resistance R2 is connected to the one end of the antenna coil L1, and the other end of the resistance R2 is connected to one end of the capacitor C1, one end of the capacitor C2, and one end of the capacitor C3. The one end of the resistance R3 is connected to the other end of the antenna coil L1, and the other end of the resistance R3 is connected to the other end of the capacitor C1 and one end of the capacitor C7. The one end of the capacitor C1 is connected to the other end of the resistance R2, the one end of the capacitor C2, and the one end of the capacitor C3, and the other end of the capacitor C1 is connected to the other end of the resistance R3 and the one end of the capacitor C7. The capacitor C1 is also connected to a BIAS terminal of the LSI 30 and a control voltage "Bias" is input thereto via the BIAS terminal. The capacitance of the capacitor C1 changes in accordance with a voltage value of the control voltage "Bias". The one end of the capacitor C2 is connected to the other end of the resistance R2, the one end of the capacitor C1, and the one end of the capacitor C3, and the other end of the capacitor C2 is connected to a TX1 terminal of the LSI 30. The one end of the capacitor C7 is connected to the other end of the resistance R3 and the other end of the capacitor C1, and the other end of the capacitor C7 is connected to a TX2 terminal of the LSI 30. The capacitor C7 has the same capacitance as the capacitor C2.

Through the configuration described above, the antenna section 21 includes a resonant circuit (series-parallel resonant circuit) 212 in which the capacitor C2 is connected in series, via the resistance R2, to the antenna coil L1 including the internal resistance R1, the capacitor C7 is connected in series, via the resistance R3, to the antenna coil L1, and the capacitor C1 is connected in parallel to the antenna coil L1. The resistances R2 and R3 are damping resistances that are inserted in order to lower the Q factor of the antenna 211.

The one end of the capacitor C3 is connected to the other end of the resistance R2, the one end of the capacitor C1, and the one end of the capacitor C2, and the other end of the capacitor C3 is connected to one end of the resistance R4. The one end of the resistance R4 is connected to the other end of the capacitor C3, and the other end of the resistance R4 is connected to one end of the resistance R5 and an RX terminal of the LSI 30. The one end of the resistance R5 is connected to the other end of the resistance R4 and the RX terminal, and the other end of the resistance R5 is connected to one end of the capacitor C4. The one end of the capacitor C4 is connected to the other end of the resistance R5, and the other end of the capacitor C4 is connected to ground. The capacitors C3 and C4 and the resistances R4 and R5 form a voltage divider circuit that performs voltage division of a received signal (RF signal) of the antenna 211 and inputs the signal to the RX terminal.

The LSI 30 includes the demodulation section 22, the voltage measurement section 24, the storage section 25, a control section 31, a diode D1, variable resistances R6 and R7, and capacitors C5 and C6. The control section 31 corresponds to the reception control section 26 and the system control section 27 illustrated in FIGS. 1 and 2.

The RX terminal of the LSI 30 is connected to the demodulation section 22 and the diode D1, and inputs a received signal of the antenna section 21 to the demodulation section 22 and the diode D1. The demodulation section 22 is configured to demodulate a signal that is input from the RX terminal and output the demodulated signal to the control section 31.

One end (anode) of the diode D1 is connected to the RX terminal and the other end (cathode) of the diode D1 is connected to the voltage measurement section 24, one end of the capacitor C5, and one end of the resistance R6. The one end of the capacitor C5 is connected to the voltage measurement section 24, the other end of the diode D1, and one end of the resistance R6, and the other end of the capacitor C5 is connected to ground. The diode D1 and the capacitor C5 form a smoothing circuit that rectifies (i.e., converts to a direct current signal) a received signal (RF signal) of the antenna section 21 that is output from the RX terminal. The diode D1 and the capacitor C5 correspond to the rectification section 23 in FIGS. 1 and 2. The voltage measurement section 24 is configured to measure the voltage (induced voltage) of a direct current signal output from the rectification section 23 and output a result of the measurement to the control section 31. The resistance R6 is a load resistance that is connected to the rectification section 23. The one end of the resistance R6 is connected to the other end of the diode D1 and the one end of the capacitor C5, and the other end of the resistance R6 is connected to ground. As mentioned above, the resistance R6 is a variable resistance and the resistance value thereof changes in accordance with a "Load" signal output from the control section 31. Use of a variable resistance as the resistance R6 enables implementation of a high dynamic range that allows reception of signals ranging from small signals to large signals. Moreover, optimal received electrical power can be obtained.

One end of the resistance R7 is connected to one end of the capacitor C6 and the TX1 terminal, and the other end of the resistance R7 is connected to the other end of the capacitor C6 and the TX2 terminal. The resistance value of the resistance R7 changes in accordance with a "Load Mod" signal output from the control section 31.

The storage section 25 is configured to store, in correspondence with communication distances, setting values for obtaining antenna characteristics of the antenna section 21 that are suitable for the corresponding communication distances. Examples of the setting values stored by the storage section 25 include a capacitance of the capacitor C1 and a resistance value of the resistance R7 that is electrically connected to the antenna 211.

When the control section 31 is in a sensing mode for controlling the antenna characteristic of the antenna section 21, the control section 31 is configured to output a "Load" signal to the resistance R6 (load resistance RL) in order to change a resistance value of the load resistance RL. The load resistance RL is electrically connected to the antenna 211 via resistances, capacitors, and so forth. The Q factor of the resonant circuit 212 is changed by changing the resistance value of the load resistance RL.

The control section 31 is configured to calculate received electrical power based on the resistance value of the load resistance RL and induced voltage measured by the voltage measurement section 24 before and after changing of the resistance value of the load resistance RL (i.e., before and after changing of the Q factor of the resonant circuit 212). The control section 31 is also configured to estimate the communication distance from a gradient (polarity) of change in received electrical power and read out a setting value from the storage section 25 that corresponds to the estimated communication distance. Moreover, the control section 31 is configured to control the antenna characteristic of the antenna section 21 in accordance with the setting value read out thereby.

For example, the control section 31 is configured to output a control voltage "Bias" to the capacitor C1, via the BIAS terminal, in order to obtain a capacitance of the capacitor C1 indicated by a setting value. Moreover, the control section 31 is configured to output a "Load Mod" signal to the resistance R7 in order that the resistance value of the resistance R7 becomes a resistance value indicated by a setting value. Note that the control section 31 includes a D/A converter (not illustrated) and outputs the control voltage "Bias" through this D/A converter.

As explained above, the resonant circuit 212 has a configuration in which the capacitors C2 and C7 are connected in series to the antenna coil L1 and in which the capacitor C1 is connected in parallel to the antenna coil L1. Also, as explained above, the capacitor C7 has the same capacitance as the capacitor C2. Therefore, the resonant frequency ω of the resonant circuit 212 is expressed by the following equation (1). Note that the resonant frequency ω=2×π×f, where actually f is the frequency and ω is the angular frequency.

$$\omega = 1/\sqrt{(L1 \times (C1 + C2/2))} \quad \text{Equation (1)}$$

Since the capacitance of the capacitor C1 changes in accordance with a voltage value of the control voltage "Bias", the resonant frequency ω of the resonant circuit 212 changes in accordance with the change in the capacitance of the capacitor C1. Accordingly, the resonant frequency of the resonant circuit 212 can be set as a value that is suitable for the communication distance.

The resistance R7 is electrically connected to the antenna 211 via resistances, capacitors, and so forth. The capacitor C1 and the antenna coil L1 are connected to one another in parallel via the resistance R7. Therefore, the Q factor (Qc1) of the capacitor C1 is expressed by the following equation (2), where ω0=2×π×13.56 MHz.

$$Qc1 = \omega 0 C1 \times R7 \quad \text{Equation (2)}$$

The Q factor (Q) of the resonant circuit 212 is expressed by the following equation (3).

$$1/Q = 1/QL + 1/Qc1 \quad \text{Equation (3)}$$

QL in equation (3) is the Q factor of the antenna 211 and is expressed by QL=ω0L1/R1. Accordingly, the Q factor of the resonant circuit 212 changes depending on the resistance value of the resistance R7. For example, the Q factor of the resonant circuit 212 can be increased by decreasing the resistance value of the resistance R7. Therefore, the Q factor of the resonant circuit 212 can be set as a value that is suitable for the communication distance through output of a "Load Mod" signal to the resistance R7 that causes the resistance value of the resistance R7 to become a setting value that corresponds to the communication distance.

Thus, it is possible to improve communication characteristics regardless of the communication distance by estimating the communication distance and controlling the antenna characteristic of the antenna 211 (resonant frequency or Q factor of the resonant circuit 212) in accordance with the estimated communication distance.

While in a communication mode (card mode) for performing communication with the transmission device 10, the control section 31 is configured to, upon output of a signal from the demodulation section 22, ascertain request content of the transmission device 10 from the signal, modulate the received signal using a response signal for the request content, and cause transmission of the modulated signal to the transmission device 10 through the antenna section 21.

Specifically, the control section 31 is configured to output a "Load Mod" signal to the resistance R7 in order to modulate (load modulate) the received signal in accordance with the response signal. As explained above, the resistance value of the resistance R7 changes in accordance with the "Load Mod" signal and voltage division of the received signal is performed in accordance with the resistance value of the resistance R7. Consequently, current flowing in the antenna coil L1 changes and the transmission device 10 receives the response signal through this change in current. Therefore, the received signal can be modulated by changing the resistance value of the resistance R7 through the "Load Mod" signal. The capacitor C6 indicates the internal capacitance of the TX1 terminal and the TX2 terminal, and the influence thereof on basic operation can be ignored.

Thus, the resistance R7 is a resistance for load modulation used in order to transmit a response signal to the transmission device 10 and may for example have resistances corresponding to two values of ON and OFF. However, as explained above, the Q factor of the resonant circuit 212 can be controlled by changing the resistance value of the resistance R7. In a situation in which the resistance R7 is used in controlling of the Q factor of the resonant circuit 212, resistance values corresponding to the two values of ON and OFF are changed in correspondence with a desired Q factor. Moreover, a resistance may be connected in parallel to the resistance R7 and may be used to control the Q factor of the resonant circuit 212.

Note that the method by which the Q factor of the resonant circuit 212 is changed when estimating the communication distance or controlling the antenna characteristic of the antenna section 21 in accordance with the estimated communication distance is not limited to the method described above in which a resistance value of the resistance R6 or the resistance R7 is changed. For example, the Q factor of the resonant circuit 212 can alternatively be changed by providing a variable resistance as at least one of the resistance R2 and the resistance R3 connected directly to the antenna 211 and changing a resistance value of the variable resistance. In other words, the Q factor of the resonant circuit 212 can be changed by changing a resistance value of a resistance that is directly or indirectly connected, and thus electrically connected, to the antenna 211.

In FIG. 3, the "Load" signal is illustrated as a signal that is output to the resistance R6 and that is restricted to within the LSI 30. However, this example is not a limitation. For example, in a situation in which the Q factor of the resonant circuit 212 is controlled by changing a resistance value of the resistance R2 or the resistance R3 included in the antenna section 21 as described above, the "Load" signal may be output to the antenna section 21 as illustrated in FIGS. 1 and 2 in order to control the resistance values of the resistance R2 and the resistance R3.

The following describes theory pertaining to estimation of the communication distance in the present disclosure.

Figure 4A:
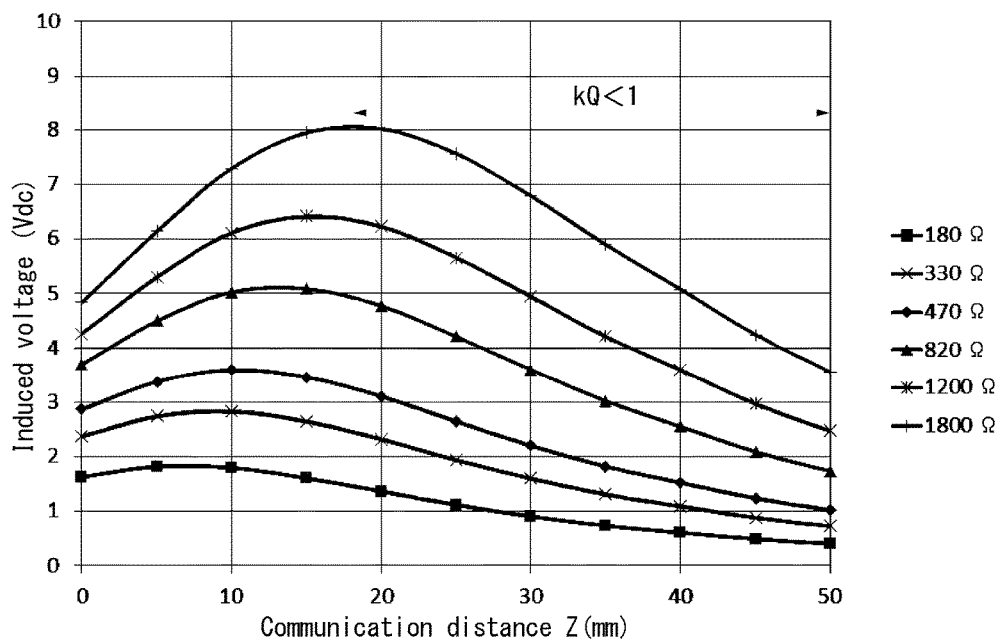
FIG. 4A illustrates a relationship between communication distance and induced voltage in a reception device.
Figure 4B:
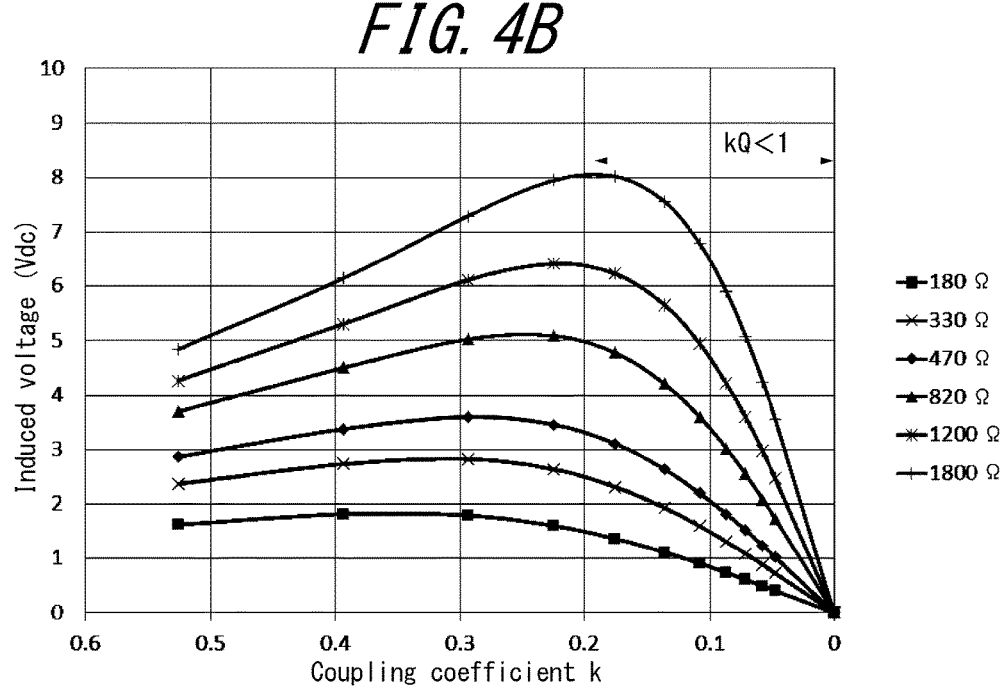
FIG. 4B illustrates a relationship between coupling coefficient and induced voltage in a reception device.

FIG. 4A illustrates a relationship between the communication distance and induced voltage (received direct current voltage) in the reception device 20. The horizontal axis in FIG. 4A indicates the communication distance and the vertical axis in FIG. 4A indicates the induced voltage. FIG. 4B illustrates a relationship between a coupling coefficient k and the induced voltage in the reception device 20. The horizontal axis in FIG. 4B indicates the coupling coefficient k and the vertical axis in FIG. 4B indicates the induced voltage. The resistance value of the load resistance RL varies from 180Ω to 1800Ω in FIGS. 4A and 4B.

Figure 5:
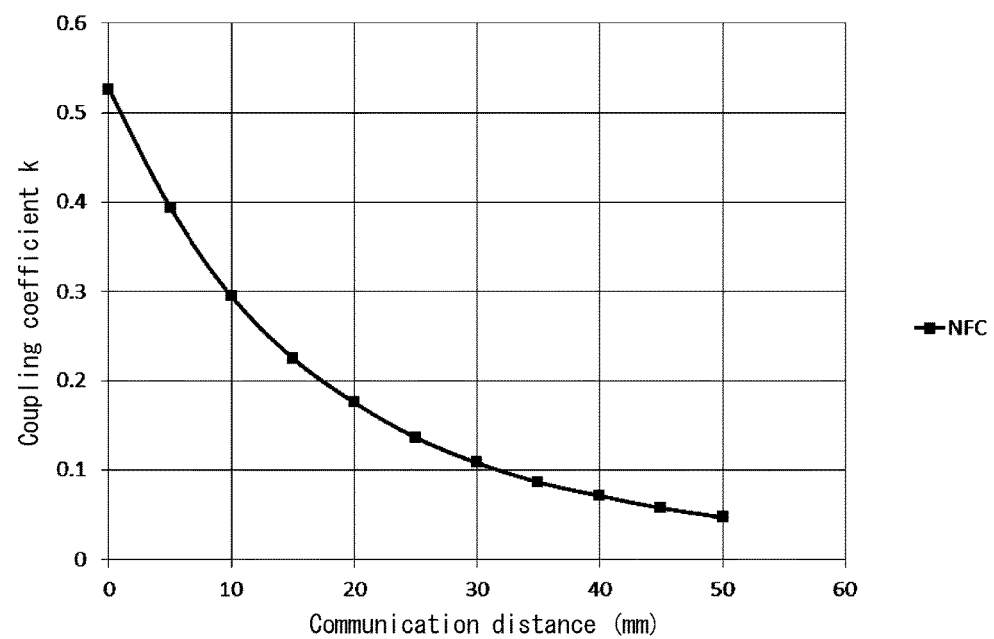
FIG. 5 illustrates a relationship between communication distance and coupling coefficient.

The coupling coefficient k is a variable that changes depending on the antenna size, the communication distance, and so forth, and that has a value of from 0 to 1. FIG. 5 illustrates an example of a relationship between the communication distance and the coupling coefficient k. FIG. 5 illustrates that as the communication distance increases, the coupling coefficient k decreases in an inversely proportion manner. However, the example illustrated in FIG. 5 is an example in which the antenna size and the communication distance are not in an ideal state and, consequently, the coupling coefficient k does not reach a value of 1 in this state even when the communication distance is zero.

FIG. 4A illustrates that as the communication distance increases from 0, the induced voltage increases in accordance with increasing communication distance. A characteristic of the induced voltage is that the induced voltage reaches a maximum once a certain communication distance is reached and then decreases in accordance with increasing communication distance. This characteristic is the same regardless of the magnitude of the resistance value of the load resistance RL. However, the magnitude of the induced voltage differs depending on the resistance value of the load resistance RL, and the induced voltage increases as the resistance value of the load resistance RL increases.

Moreover, the communication distance at which the induced voltage reaches a maximum changes depending on the resistance value of the load resistance RL and becomes a shorter distance as the resistance value of the load resistance RL decreases. In the example illustrated in FIG. 4A, the induced voltage reaches a maximum at a communication distance of approximately 18 mm when the resistance value of the load resistance RL is 1800Ω and reaches a maximum at a communication distance of approximately 5 mm when the resistance value of the load resistance RL is 180Ω.

In general, power reception efficiency of the reception device is proportional to the product (kQ) of the coupling coefficient k and the Q factor (square root of the product of the Q factor of the resonant circuit in the antenna section 13 of the transmission device 10 and the Q factor of the resonant circuit 212 in the reception device 20). A larger value for kQ signifies that communication can be performed with higher efficiency. It is thought that the induced voltage in the reception device 20 reaches a maximum when there is matching of impedance of the resonant circuit in the transmission device 10 and impedance of the resonant circuit in the reception device 20, which is at a distance at which kQ=1. As explained above, received electrical power reaches a maximum in a state in which kQ=1, which is, in other words, a state in which matching occurs. Theoretically, the efficiency in the aforementioned state does not exceed 50% of transmitted electrical power. The efficiency can be increased by increasing kQ, but increasing kQ leads to a decrease in received electrical power. Therefore, it is necessary to increase the transmitted electrical power in order to obtain the required electrical power.

As explained above, the Q factor of the resonant circuit 212 is changed by changing the resistance value of the load resistance RL. For example, a decrease in the resistance value of the load resistance RL leads to a decrease in the Q factor (FIG. 6B described further below). As a result, the communication distance at which the induced voltage reaches a maximum decreases (i.e., shifts toward a short distance-side) as can be understood from the relationship between the communication distance and the coupling coefficient k illustrated in FIG. 5.

FIG. 4B illustrates that the induced voltage reaches a maximum at a certain coupling coefficient k regardless of the magnitude of the resistance value of the load resistance RL. However, the induced voltage increases and decreases more gradually when the resistance value of the load resistance RL is smaller. Moreover, when the resistance value of the load resistance RL is smaller, the induced voltage is smaller and reaches a maximum at a larger coupling coefficient k.

Figure 6A:
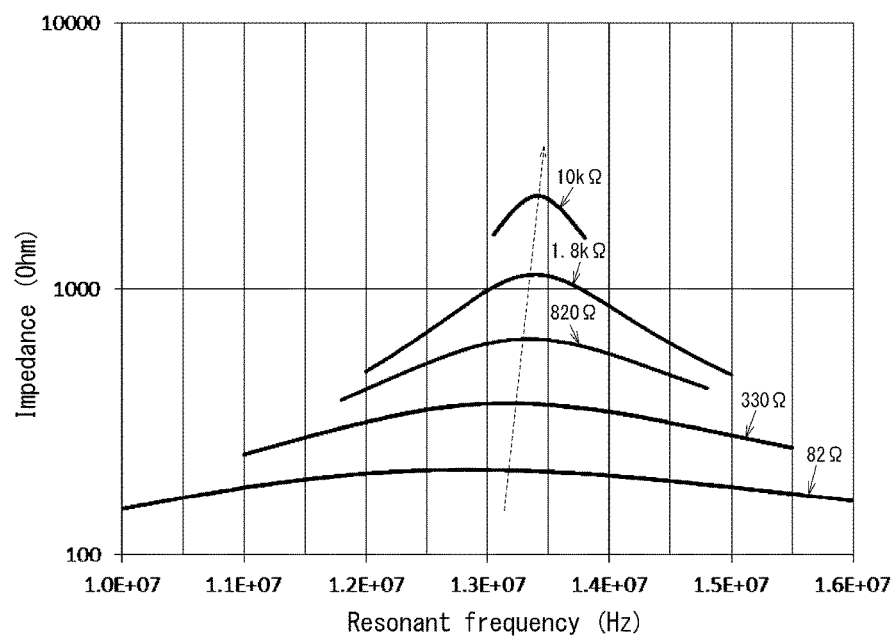
FIG. 6A illustrates a relationship between resonant frequency and impedance of a resonant circuit.
Figure 6B:
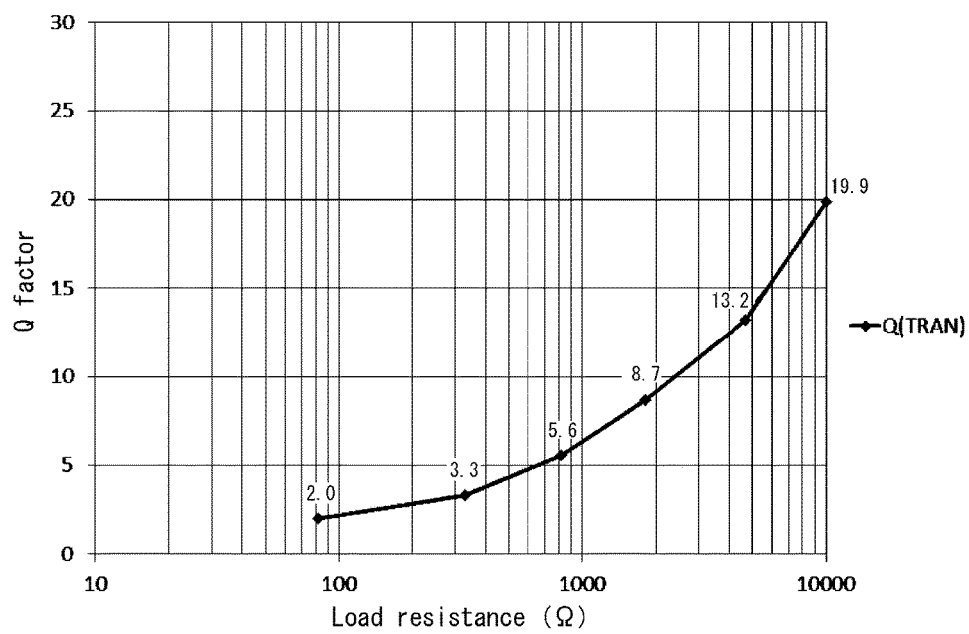
FIG. 6B illustrates a relationship between load resistance and Q factor of a resonant circuit.

FIG. 6A illustrates a relationship between resonant frequency and impedance of the resonant circuit 212 in a situation in which the Q factor of the antenna 211 is 68. The horizontal axis in FIG. 6A indicates the resonant frequency and the vertical axis in FIG. 6A indicates the impedance. In FIG. 6A, the resistance value of the load resistance RL varies from 82Ω to 10 kΩ. FIG. 6B illustrates a relationship between the load resistance RL and the Q factor of the resonant circuit 212 in a situation in which the Q factor of the antenna 211 is 68. The horizontal axis in FIG. 6B indicates the load resistance RL and the vertical axis in FIG. 6B indicates the Q factor.

FIG. 6A illustrates that as the resistance value of the load resistance RL increases, the resonance characteristic becomes shaper and the center frequency rises. Furthermore, the impedance also increases as the resistance value of the load resistance RL increases. Moreover, FIG. 6B illustrates that the Q factor increases as the resistance value of the load resistance RL increases. In other words, as the resistance value of the load resistance RL increases, the Q factor increases and the resonant frequency rises. Moreover, as the resistance value of the load resistance RL decreases, the Q factor decreases and the resonant frequency falls.

Figure 7A:
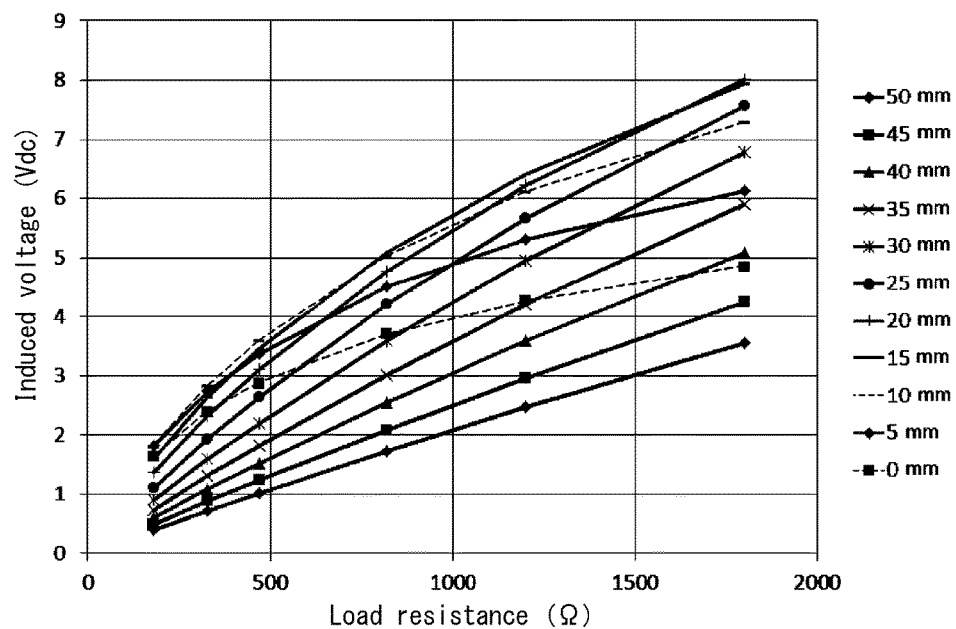
FIG. 7A illustrates a relationship between load resistance and induced voltage in a reception device.
Figure 7B:
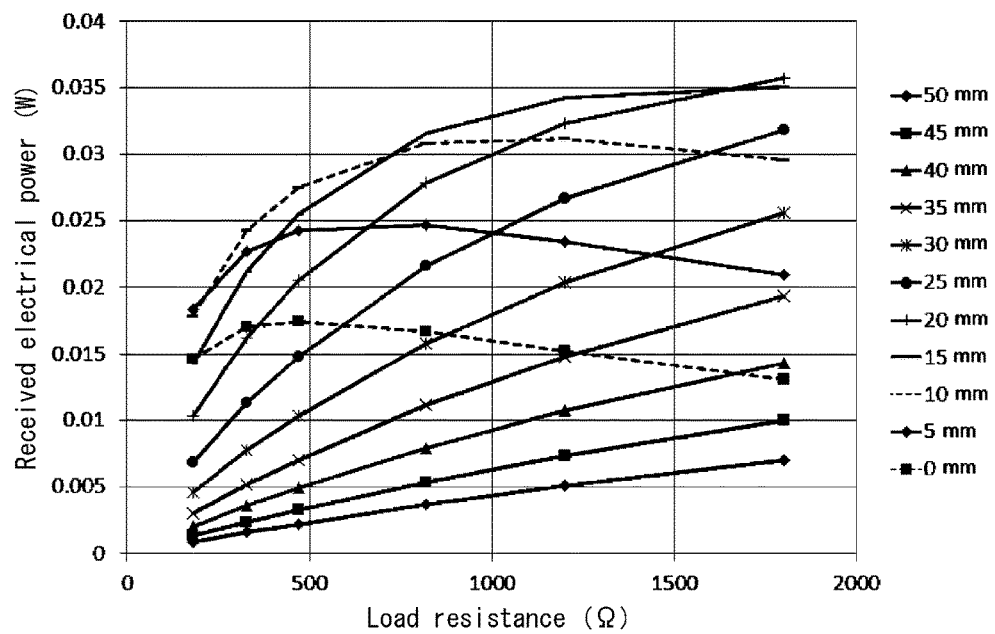
FIG. 7B illustrates a relationship between load resistance and received electrical power in a reception device.

FIG. 7A illustrates a relationship between the load resistance RL and the induced voltage and FIG. 7B illustrates a relationship between the load resistance RL and the received electrical power. The horizontal axis in FIG. 7A indicates the load resistance RL and the vertical axis in FIG. 7A indicates the induced voltage. Furthermore, the horizontal axis in FIG. 7B indicates the load resistance RL and the vertical axis in FIG. 7B indicates the received electrical power. The communication distance varies from 0 to 50 mm in FIGS. 7A and 7B.

FIG. 7A illustrates that when the communication distance is long (i.e., when the communication distance is from 40 mm to 50 mm in the example illustrated in FIG. 7A), the induced voltage increases approximately linearly in accordance with increasing load resistance RL. When the communication distance shortens, the linearity decreases and the aforementioned increase in the induced voltage becomes a gradual increase approximated by a quadratic curve. In other words, it can be seen that the communication distance is long when an increase in the induced voltage relative to a change in the resistance value of the load resistance RL has high linearity, and that the communication distance shortens in accordance with decreasing linearity of this increase in the induced voltage. Accordingly, it is understood that a change in the resistance value of the load resistance RL, and thus also a change in the induced voltage due to a change in the Q factor of the resonant circuit 212, is dependent on the communication distance. This dependence can be seen more clearly for the received electrical power illustrated in FIG. 7B.

FIG. 7B illustrates that when the communication distance is long (i.e., when the communication distance is from 40 mm to 50 mm in the example illustrated in FIG. 7B), the received electrical power increases approximately linearly in accordance with increasing load resistance RL. When the communication distance shortens, the linearity decreases and the aforementioned increase in the received electrical power becomes a gradual increase approximated by a quadratic curve. Upon comparison of FIGS. 7A and 7B, it can be seen that the decrease in linearity with decreasing communication distance is more noticeable for the received electrical power illustrated in FIG. 7B than for the induced voltage illustrated in FIG. 7A.

When the communication distance is even shorter (i.e., when the communication distance is 10 mm or shorter in the example illustrated in FIG. 7B), the received electrical power decreases as the resistance value of the load resistance RL increases. Therefore, when the communication distance is short, the gradient of change in the received electrical power inverts from positive to negative. In other words, when kQ<1 (i.e., when the communication distance is long), the gradient is positive because an increase in Q (i.e., an increase in the resistance value of the load resistance RL) is accompanied by an increase in the received electrical power. On the other hand, when kQ>1 (i.e., when the communication distance is short), the gradient is negative because an increase in Q is accompanied by a decrease in the received electrical power.

Accordingly, it can be seen that a change in the received electrical power (and the induced voltage) in the reception device 20 due to a change in the resistance value of the load resistance RL, i.e., a change in the Q factor of the resonant circuit 212, is dependent on the communication distance. Therefore, the communication distance can be estimated based on the change in the received electrical power due to the change in the resistance value of the load resistance RL (i.e., the change in the Q factor of the resonant circuit 212). Herein, when the resistance value of the load resistance RL, i.e., the Q factor of the resonant circuit 212, is changed in order to estimate the communication distance, it is thought that it is possible to adopt either of two methods: a method in which the Q factor is changed in a direction toward larger values; or a method in which the Q factor is changed in a direction toward smaller values. The following explains the case in which the Q factor is changed in the direction toward larger values.

In the following description, two gradients are considered for the gradient of change in the received electrical power. Specifically, gradient 1 is calculated in accordance with the following equation (4) and gradient 2 is calculated in accordance with the following equation (5). In equations (4) and (5), RL(n) and P(RL_n) respectively indicate the resistance value of the load resistance RL and the received electrical power at a certain point n.

[MATH. 1]

$$\text{Gradient 1} = \frac{P(RL\_n+1) - P(RL\_n)}{RL(n+1) - RL(n)} \quad \text{Equation (4)}$$

$$\text{Gradient 2} = \frac{P(RL\_1.8k) - P(RL\_n)}{RL(1.8k) - RL(n)} \quad \text{Equation (5)}$$

Figure 8A:
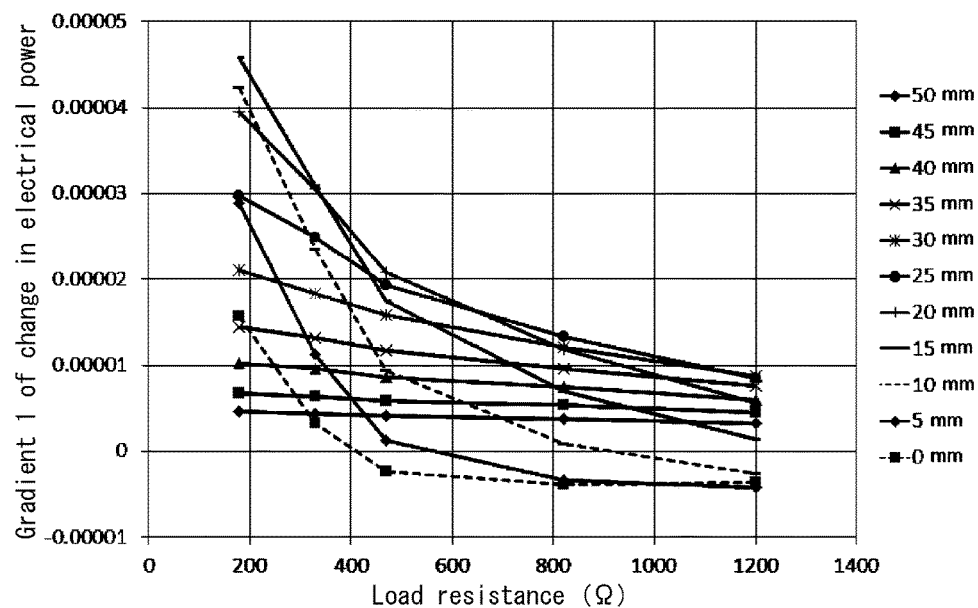
FIG. 8A illustrates a relationship between load resistance and gradient of change in received electrical power.
Figure 8B:
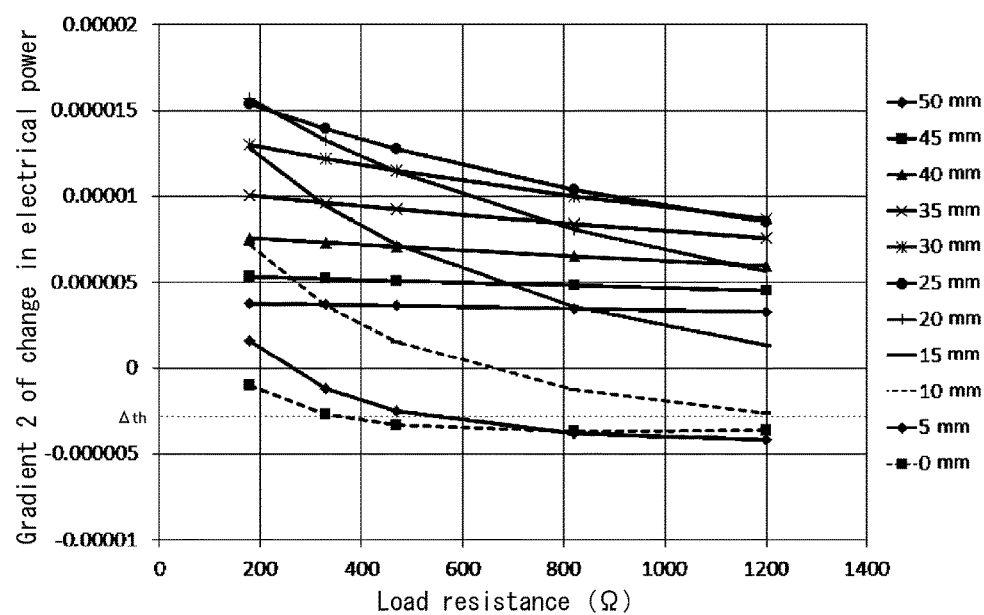
FIG. 8B illustrates a relationship between load resistance and gradient of change in received electrical power.

FIG. 8A illustrates a relationship between the load resistance RL and gradient 1 of change in the received electrical power. The horizontal axis in FIG. 8A indicates the load resistance RL and the vertical axis in FIG. 8A indicates gradient 1. FIG. 8B illustrates a relationship between the load resistance RL and gradient 2 of change in the received electrical power. The horizontal axis in FIG. 8B indicates the load resistance RL and the vertical axis in FIG. 8B indicates gradient 2. The communication distance varies from 0 to 50 mm in FIGS. 8A and 8B.

FIG. 8A illustrates that when the Q factor of the resonant circuit 212 is large (i.e., when the resistance value of the load resistance RL is large), at a long communication distance (i.e., a communication distance of from 35 mm to 50 mm in the example illustrated in FIG. 8A), the change in electrical power, which is in other words the gradient (gradient 1), has a positive sign (i.e., electrical power increases), is a small value, and exhibits an approximately linear decrease to the right relative to the load resistance RL. However, as the communication distance shortens, gradient 1 becomes larger in a region in which the resistance value of the load resistance RL is small, and changes in a less linear manner.

The following description focuses on a situation in which the resistance value of the load resistance RL is 1200Ω. In this situation, the value of gradient 1 increases as the communication distance shortens from 50 mm but reaches saturation at a communication distance of 30 mm. The value of gradient 1 when the communication distance is 25 mm is approximately the same as when the communication distance is 30 mm. Furthermore, the value of gradient 1 decreases as the communication distance shortens from 25 mm.

For example, when the communication distance is 15 mm, the value of gradient 1 is smaller than when the communication distance is 50 mm and is approximately zero. Furthermore, when the communication distance is 10 mm, the value of gradient 1 has approximately the same absolute value as when the communication distance is 15 mm, but is inverted to negative polarity. In other words, the received electrical power decreases in accompaniment to shortening of the communication distance. The above is in accordance with the case in which the resistance value of the load resistance RL is 1200Ω in FIG. 4A where the induced voltage is at a maximum when the communication distance is 15 mm and decreases when the communication distance changes to 10 mm.

In the same way as above, the following description focuses on a situation in which the resistance value of the load resistance RL is 820Ω. In this situation, gradient 1 in FIG. 8A is approximately zero when the communication distance is 10 mm and is inverted to negative polarity when the communication distance is 5 mm. On the other hand, the induced voltage in FIG. 4A is at a maximum when the communication distance is approximately 12 mm and decreases when the communication distance is 10 mm. The communication distance at which voltage decreases is estimated to be 5 mm from FIG. 8A, which is slightly shifted relative to in FIG. 4A.

In contrast, in a situation in which the resistance value of the load resistance RL is 820Ω in FIG. 8B, gradient 2 is approximately zero when the communication distance is 10 mm and the value of the gradient 2 inverts from positive to negative at a communication distance between 10 mm and 15 mm, which is in accordance with the characteristic illustrated in FIG. 4A.

The difference between gradient 1 illustrated in FIG. 8A and gradient 2 illustrated in FIG. 8B is whether, in calculation of the difference in received electrical power, a value between two points is used for which the change in the resistance value of the load resistance RL is small (FIG. 8A) or whether a value between two points is used for which the change in the resistance value of the load resistance RL is large (FIG. 8B).

Therefore, in order to accurately estimate the communication distance in the present disclosure, it is preferable that the received electrical power is measured in a situation in which the resistance value of the load resistance RL is a resistance value RA and in a situation in which the resistance value of the load resistance RL is a resistance value RB that is larger than the resistance value RA (i.e., in situations in which the Q factor of the resonant circuit 212 is a Q factor corresponding to the resistance value RA (first Q factor) and a Q factor corresponding to the resistance value RB (second Q factor)), and that the difference between the received electrical power measured in these situations is calculated. Furthermore, in order to accurately estimate the communication distance in the present disclosure, it is preferable that the resistance value RA is a value that enables received electrical power for when the reception device 20 performs normal communication (i.e., operates in the card mode) to be obtained (i.e., the resistance value RA is preferably a value that enables a Q factor set during normal communication to be obtained), and the resistance value RB is preferably as large as possible. In other words, the difference between the resistance value RA and the resistance value RB is preferably as large as possible.

Note that the communication distance can also be estimated by a method in which the Q factor of the resonant circuit 212 is decreased (i.e., a method in which the resistance value RB is smaller than the resistance value RA). Moreover, the method in which the Q factor is increased and the method in which the Q factor is decreased can be combined to calculate an electrical power difference when the Q factor is increased and an electrical power difference when the Q factor is decreased in order that the communication distance can be estimated using a larger amount of change in the resistance value of the load resistance RL. However, care should be taken in the case of decreasing the Q factor. The reason for this is explained with reference to FIG. 7A.

As illustrated in FIG. 7A, an increase in the resistance value of the load resistance RL (i.e., an increase in the Q factor) leads to an increase in the induced voltage at any communication distance and any resistance value. Therefore, there is no need to worry that changing the load resistance in order to estimate the communication distance will cause the reception device 20 to stop functioning due to a drop in voltage.

On the other hand, a decrease in the resistance value of the load resistance RL (i.e., a decrease in the Q factor) leads to a decrease in the induced voltage and may, depending on settings, lead to a situation in which a voltage required for normal operation of the reception device 20 (for example, from 2 V to 2.5 V required for LSI operation) cannot be maintained. Therefore, increasing the Q factor enables estimation of the communication distance in a more stable manner.

Next, operation of the reception device 20 illustrated in FIG. 3 is described.

Figure 9:
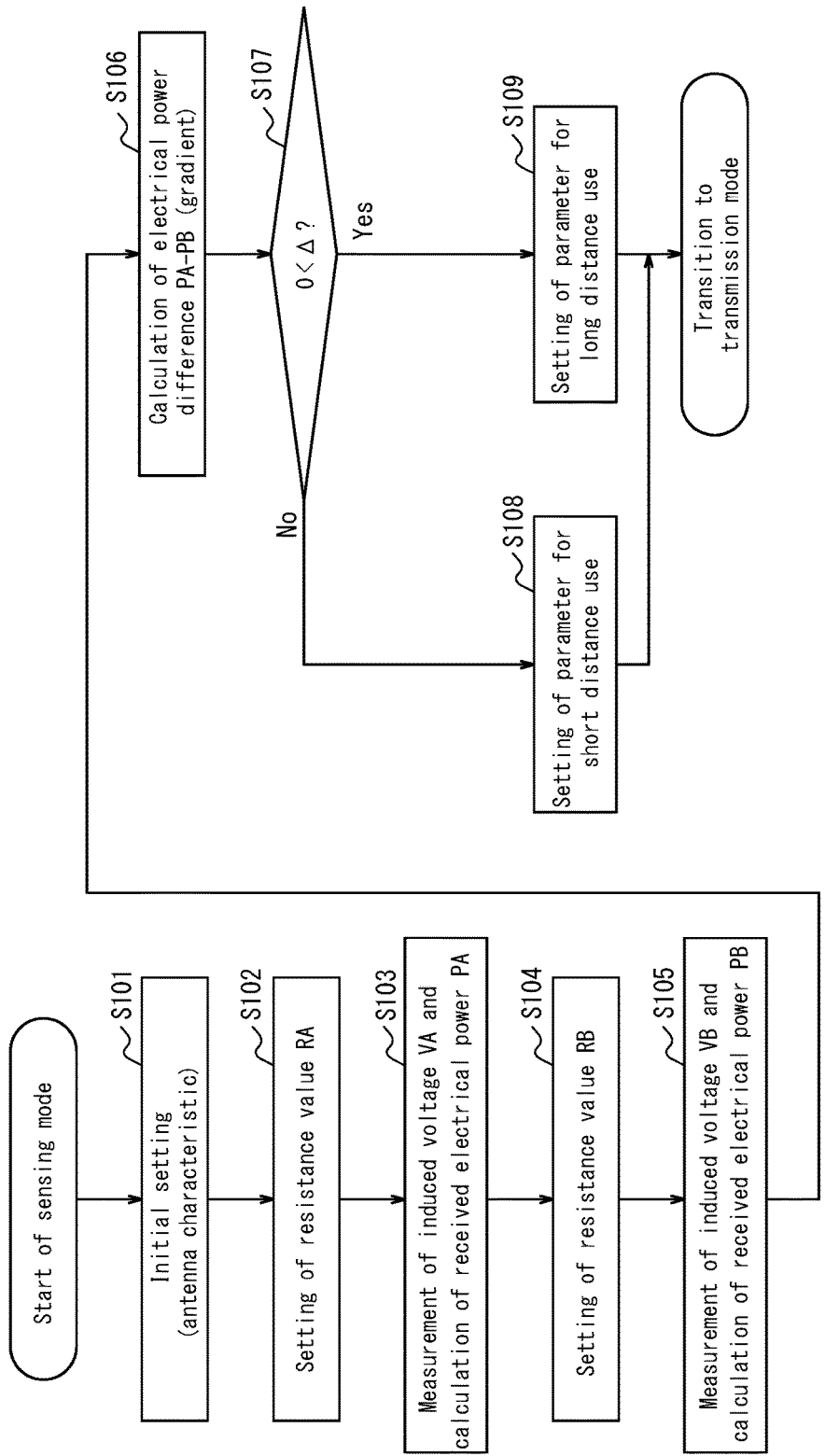
FIG. 9 is a flowchart illustrating an example of operation of the reception device illustrated in FIG. 3.

FIG. 9 is a flowchart illustrating an example of operation of the reception device 20.

Upon the start of the sensing mode, the control section 31 sets an antenna characteristic of the antenna section 21, such as the resonant frequency or the Q factor of the resonant circuit 212, as a predetermined initial value (step S101).

Next, the control section 31 sets the resistance value of the load resistance RL as the resistance value RA (step S102). As explained above, the resistance value RA is a value that leads to the Q factor of the resonant circuit 212 becoming a Q factor for use during normal operation in the card mode.

The voltage measurement section 24 measures an induced voltage VA at the resistance value RA and outputs a result of the measurement to the control section 31. The control section 31 uses the induced voltage VA measured by the voltage measurement section 24 and the resistance value RA to calculate received electrical power PA ($=VA^2/RA$; first received electrical power) (step S103), and stores the calculated value in the storage section 25.

Next, the control section 31 sets the resistance value of the load resistance RL as the resistance value RB (RB>RA) (step S104). In other words, the control section 31 increases the Q factor of the resonant circuit 212.

The voltage measurement section 24 measures an induced voltage VB at the resistance value RB and outputs a result of the measurement to the control section 31. The control section 31 uses the induced voltage VB measured by the voltage measurement section 24 and the resistance value RB to calculate received electrical power PB ($=VB^2/RB$; second received electrical power) (step S105), and stores the calculated value in the storage section 25.

Next, the control section 31 calculates the difference (gradient $\Delta$) between the received electrical power PA and the received electrical power PB stored by the storage section 25 (step S106).

Thereafter, the control section 31 determines whether or not the calculated gradient $\Delta$ is greater than zero (i.e., whether or not the gradient $\Delta$ is a positive value) (step S107).

As illustrated in FIG. 8B, the gradient $\Delta$ is generally no greater than zero when the communication distance is short (i.e., when the communication distance is from 0 to 10 mm in the example illustrated in FIG. 8B). Therefore, in a situation in which the control section 31 determines that the gradient $\Delta$ is no greater than zero (step S107: No), the control section 31 estimates that the communication distance is short (kQ>1). The control section 31 reads out a setting value (parameter for short distance use) from the storage section 25 that corresponds to a situation in which the communication distance is a short distance (second distance) (i.e., a situation in which the communication distance is included in a range for which kQ>1), and controls an antenna characteristic of the antenna section 21, such as the resonant frequency or the Q factor of the resonant circuit 212, in accordance with the parameter for short distance use that is read out thereby (step S108).

Specific examples of settings for short distance use include decreasing the Q factor of the resonant circuit 212 to a smaller value than the initial value (i.e., the Q factor at the resistance value RA) and raising the resonant frequency of the resonant circuit 212 to a higher frequency than 13.56 MHz.

On the other hand, as illustrated in FIG. 8B, the gradient $\Delta$ is greater than zero when the communication distance is long (for example, when the communication distance is 15 mm or longer). Therefore, in a situation in which the control section 31 determines that the gradient $\Delta$ is greater than zero (step S107: Yes), the control section 31 estimates that the communication distance is long. The control section 31 reads out a setting value (parameter for long distance use) from the storage section 25 that corresponds to a situation in which the communication distance is a long distance (first distance) (i.e., a situation in which the communication distance is included in a range for which kQ<1), and controls an antenna characteristic of the antenna section 21, such as the resonant frequency or the Q factor of the resonant circuit 212, in accordance with the parameter for long distance use that is read out thereby (step S109).

Specific examples of settings for long distance use include increasing the Q factor of the resonant circuit 212 to a larger value than the initial value (i.e., the Q factor at the resistance value RA) and lowering the resonant frequency of the resonant circuit 212 to a lower frequency than 13.56 MHz. However, in the case of the setting for long distance use, it is preferable that the resistance value of the load resistance RL is also taken into account in control of the antenna characteristic of the antenna section 21.

Figure 10A:
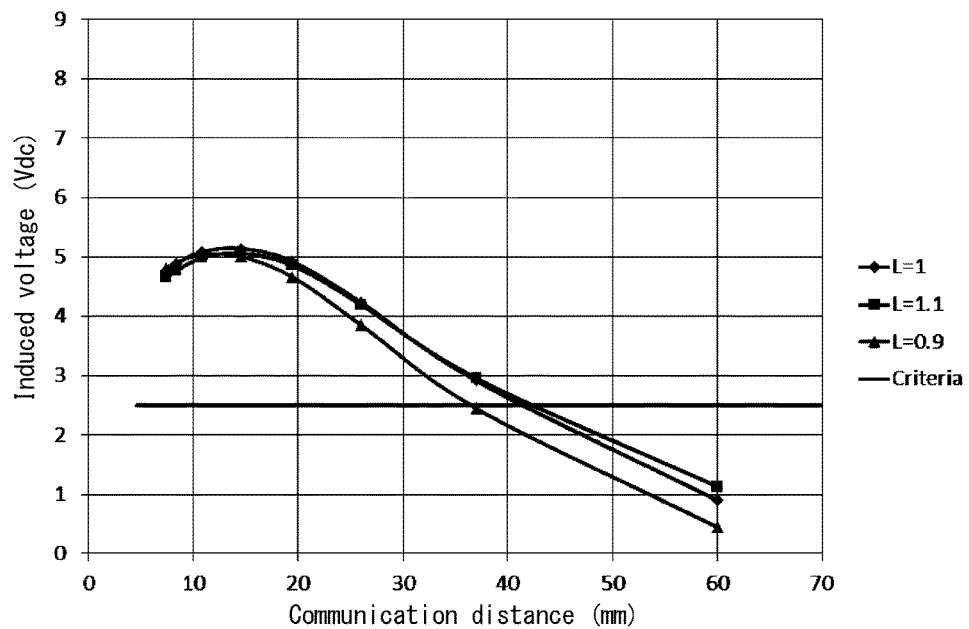
FIG. 10A illustrates a relationship between communication distance and induced voltage.
Figure 10B:
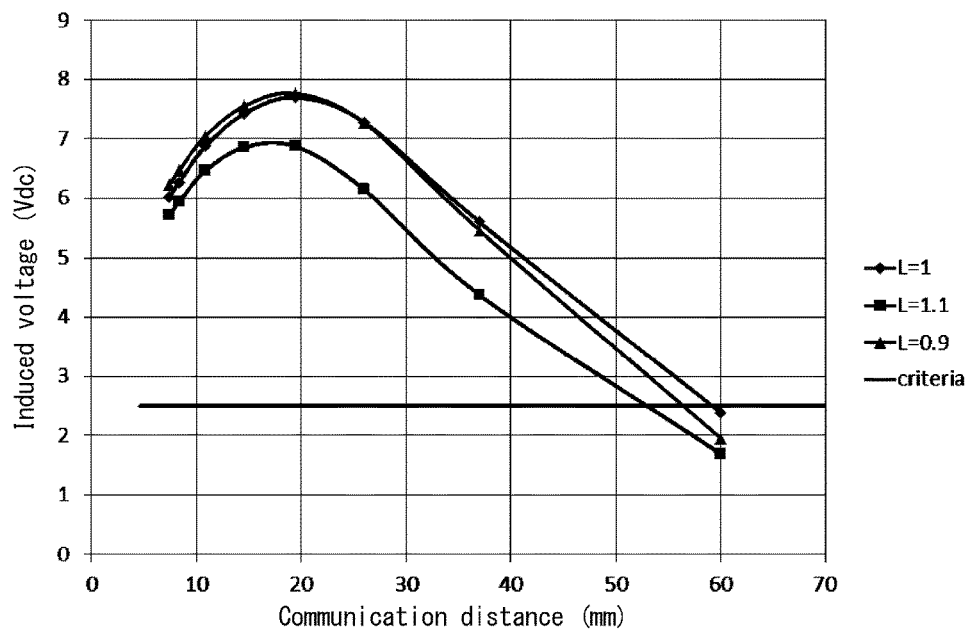
FIG. 10B illustrates a relationship between communication distance and induced voltage.

FIGS. 10A and 10B each illustrate change in induced voltage depending on the resonant frequency of the resonant circuit 212. FIG. 10A illustrates a situation in which the resistance value of the load resistance RL is 820Ω (i.e., a situation in which the Q factor is small) and FIG. 10B illustrates a situation in which the resistance value of the load resistance RL is 1800Ω (i.e., a situation in which the Q factor is large). In each of FIGS. 10A and 10B, an antenna L value (resonant frequency) varies from 0.9 to 1.1.

In the situation illustrated in FIG. 10A in which the resistance value of the load resistance RL is 820Ω, at a long distance (for example, a communication distance of from 50 mm to 60 mm), the induced voltage increases as the antenna L value increases, and thus as the resonant frequency decreases.

On the other hand, in the situation illustrated in FIG. 10B in which the resistance value of the load resistance RL is 1800Ω, at a long distance (for example, a communication distance of from 50 mm to 60 mm), the induced voltage is highest when the antenna L value is 1.0, followed by when the antenna value L is 0.9 and when the antenna value is 1.1 in this order. The reason for this is that when the resistance value of the load resistance RL is large, setting the resonant frequency of the resonant circuit 212 as slightly higher than the initial value (for example, 13.56 MHz) at long distance leads to optimization of resonance conditions in a state including the load resistance RL. In a specific example, the induced voltage is larger in a situation in which the resonant frequency of the resonant circuit 212 is set as 14.2 MHz corresponding to when the antenna L value is 0.9 than in a situation in which the resonant frequency of the resonant circuit 212 is set as 13.56 MHz. Thus, the resonant frequency at which the induced voltage is at a maximum changes depending on the resistance value of the load resistance RL. Therefore, in the case of a setting for long distance use, it is preferable that the resistance value of the load resistance RL is taken into account in control of the antenna characteristic of the antenna section 21, and optimization is for example performed for each different model of the reception device 20.

The following description once again refers to FIG. 9. After the control section 31 has controlled the antenna characteristic of the antenna section 21 in accordance with the parameter for long distance use or the parameter for short distance use, the control section 31 transitions to the communication mode.

Although FIG. 9 is explained for an example in which the control section 31 distinguishes between the communication distance being a short distance or a long distance when controlling the antenna characteristic of the antenna section 21, this example is not a limitation.

The control section 31 may determine that the communication distance is a medium distance when kQ=1 or kQ is a value close to 1 (hereinafter, referred to collectively as when kQ=1), and may control the antenna characteristic of the antenna section 21 in accordance with a parameter for medium distance use. The following refers to the flowchart illustrated in FIG. 11 to describe operation of the reception device 20 in a situation in which the control section 31 determines whether the communication distance is a short distance, a medium distance, or a long distance. Processes in FIG. 11 that are the same as in FIG. 9 are denoted using the same reference signs and explanation thereof is omitted.

Figure 11:
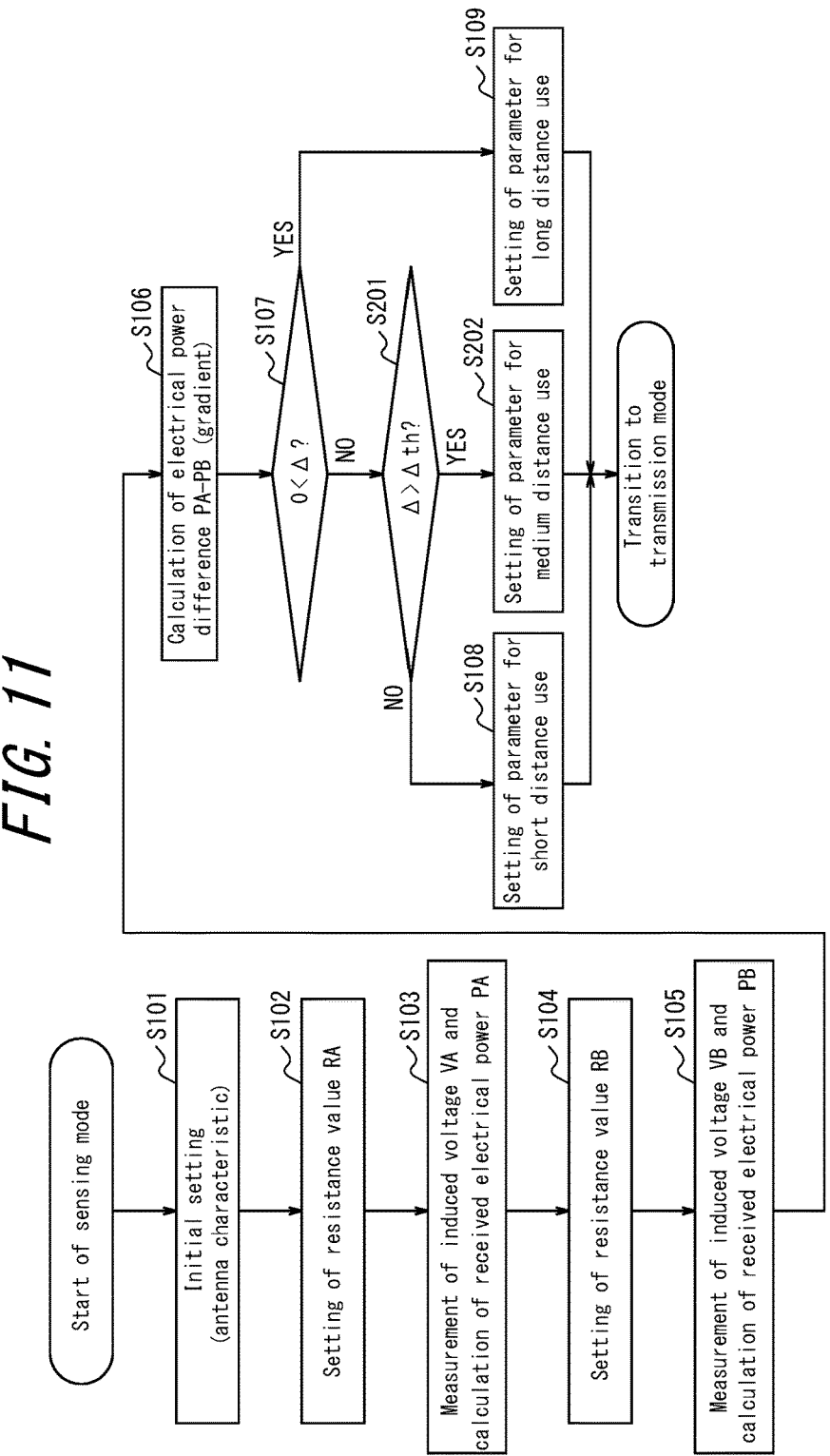
FIG. 11 is a flowchart illustrating another example of operation of the reception device illustrated in FIG. 3.

Note that in FIG. 11, the storage section 25 stores a threshold value $\Delta$th for the control section 31 to determine whether or not kQ=1. The threshold value $\Delta$th is a threshold value pertaining to the gradient of change in received electrical power and is a value slightly smaller than 0 as illustrated in FIG. 8B. More specifically, the threshold value $\Delta$th is a negative value and is the value of a gradient for which the received electrical power is at a maximum or substantially at a maximum. Furthermore, the storage section 25 also stores a parameter for medium distance use that is a setting value for obtaining an antenna characteristic of the antenna section 21 that is suitable for a situation in which the communication distance is a medium distance (for example, 15 mm). Note that the threshold value $\Delta$th is influenced by the magnitude of change in the load resistance RL as illustrated in FIGS. 7 and 8, and the value thereof is roughly −0.000003. It is preferable that the threshold value $\Delta$th is −0.0000015, which is half of the aforementioned value, in order to more accurately estimate an optimum power point.

In a situation in which the control section 31 determines that the calculated gradient $\Delta$ is no greater than zero (step S107: No), the control section 31 determines whether or not the gradient $\Delta$ is greater than the threshold value $\Delta$th stored by the storage section 25 (step S201).

In a situation in which the control section 31 determines that the gradient $\Delta$ is no greater than the threshold value $\Delta$th (step S201: No), the control section 31 proceeds to the process in step S108. In other words, the control section 31 controls the antenna characteristic of the antenna section 21 in accordance with the parameter for short distance use.

In a situation in which the gradient $\Delta$ is greater than the threshold value $\Delta$th, the gradient $\Delta$ is zero or a value extremely close to zero. In such a situation, it can be determined that kQ=1. Therefore, in a situation in which the control section 31 determines that the gradient $\Delta$ is greater than the threshold value $\Delta$th (step S201: Yes), the control section 31 estimates that the communication distance is a medium distance (kQ=1). Moreover, the control section 31 reads out a setting value (parameter for medium distance use) stored by the storage section 25 that corresponds to a situation in which the communication distance is a medium distance (third distance), and controls the antenna characteristic of the antenna section 21 in accordance with the parameter for medium distance use that is read out thereby.

As explained above, the threshold value $\Delta$th is smaller than zero and is the value of a gradient at which received electrical power is a maximum or substantially at a maximum. Accordingly, in a situation in which the gradient $\Delta$ is smaller than zero and greater than the threshold value $\Delta$th, which is a negative value, it can be estimated that the communication distance is a medium distance (kQ=1).

Thus, it is possible to estimate whether the communication distance is a short distance, a medium distance, or a long distance by determining whether or not the gradient $\Delta$ is greater than the threshold value $\Delta$th, which enables finer control of the antenna characteristic of the antenna section 21 in accordance with the communication distance. As a result, communication characteristics can be improved. Although in the present embodiment, the threshold value $\Delta$th is set as a negative value and the communication distance is determined to be a medium distance in a situation in which the change in the received electrical power is included within a range of values that are greater than the threshold value Δth (for example, −0.0000015) and no greater than zero, this is not a limitation. For example, the communication distance may be determined to be a medium distance in a situation in which the change in the received electrical power is included within a range of values that are smaller than 0.0000015 and greater than −0.0000015.

Figure 12:
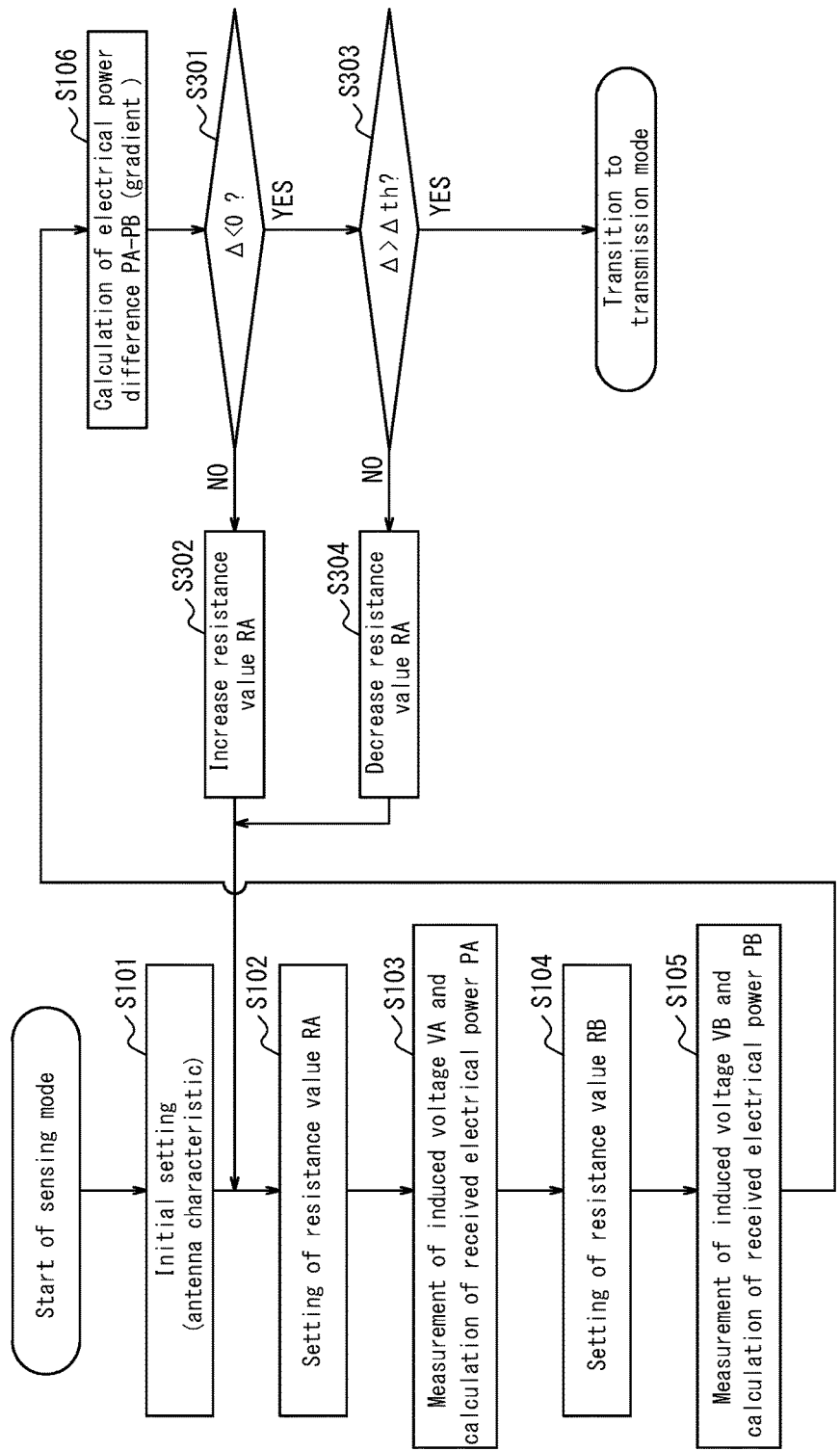
FIG. 12 is a flowchart illustrating yet another example of operation of the reception device illustrated in FIG. 3.

FIG. 12 is a flowchart illustrating yet another example of operation of the reception device 20. Processes in FIG. 12 that are the same as in FIG. 11 are denoted using the same reference signs and explanation thereof is omitted. The operation illustrated in FIG. 12 is suitable for a system in which load current is controlled, such as in wireless power supply.

The control section 31 calculates the gradient Δ (step S106) and determines whether or not the calculated gradient Δ is smaller than zero (step S301).

In a situation in which the control section 31 determines that the gradient Δ is zero or greater (step S301: No), the control section 31 increases the resistance value RA by a specific value ΔR (step S302) and returns to the process in step S102. The control section 31 repeats the processes from step S102 to step S302 until the control section 31 determines that the gradient Δ is smaller than zero. When the gradient Δ is zero or greater, kQ<1. Therefore, by increasing the resistance value RA in a situation in which the gradient Δ is zero or greater, it is possible to raise the Q factor of the resonant circuit 212 and cause kQ to approach 1.

Upon determining that the gradient Δ is smaller than zero, the control section 31 determines whether or not the gradient Δ is greater than the threshold value Δth (step S303).

In a situation in which the control section 31 determines that the gradient Δ is no greater than the threshold value Δth (step S303: No), the control section 31 decreases the resistance value RA by a specific value ΔR (step S304) and returns to the process in step S102. The control section 31 repeats the processes from step S102 to step S304 until the control section 31 determines that the gradient Δ is greater than the threshold value. In a situation in which the gradient Δ is no greater than the threshold value Δth, kQ>1. Therefore, by decreasing the resistance value RA in a situation in which the gradient Δ is no greater than the threshold value Δth, it is possible to lower the Q factor of the resonant circuit 212 and cause kQ to approach 1.

In a situation in which the control section 31 determines that the gradient Δ is greater than the threshold value Δth (step S303: Yes), the control section 31 determines that kQ=1 has been reached, and transitions to the communication mode.

A state in which the gradient Δ is smaller than zero and greater than the threshold value Δth is a state in which kQ=1. As a result of changing the resistance value RA as described above until kQ=1 is reached, communication can always be performed in a state in which kQ=1, which is a state in which the induced voltage is at a maximum, and, as a consequence, communication characteristics can be improved. Note that as described above, changing the resistance value of the load resistance RL leads to a change in the Q factor of the resonant circuit 212 and, as a result, also leads to a change in the antenna characteristic of the antenna section 21. Therefore, it is also the case in FIG. 12 that the control section 31 changes the antenna characteristic of the antenna section 21 in accordance with a change in received electrical power.

FIG. 13 is a timing chart for a received signal at the RX terminal illustrated in FIG. 3. The horizontal axis in FIG. 13 indicates passage of time and the vertical axis in FIG. 13 indicates strength of the received signal at the RX terminal. Note that FIG. 13 illustrates a timing chart for a situation in which the parameter for long distance use is set in the operation illustrated in FIG. 9.

When the reception device 20 transitions to the sensing mode (i.e., when a sensing period starts), the antenna characteristic is set as an initial value (for example, the resonant frequency of the resonant circuit 212 is set as 13.56 MHz; load resistance RL=1800Ω), and then the resistance value of the load resistance RL is set as the resistance value RA (steps S101 and S102). Herein, the resistance value RA is the same as the initial value (1800Ω) for the resistance value of the load resistance RL.

Next, received electrical power PA at the resistance value RA is calculated (step S103).

Subsequently, the resistance value of the load resistance RL is set as the resistance value RB (RB>RA) (step S104). Since the resistance value RB is greater than the resistance value RA, the strength of the received signal at the RX terminal becomes greater than when the resistance value of the load resistance RL is set as the resistance value RA. As explained above, it is beneficial for the difference between the resistance value RB and the resistance value RA to be as large as possible in order to enable accurate predication of the communication distance. Therefore, the LSI 30 preferably has a power-saving mode for estimation of the communication distance.

Next, received electrical power PB at the resistance value RB is calculated (step S105).

Thereafter, the difference between the received electrical power PA and the received electrical power PB (i.e., the gradient Δ) is calculated, the communication distance is estimated in accordance with the gradient Δ, and the antenna characteristic of the antenna section 21 is set in accordance with the estimated communication distance (step S109). In a situation in which the communication distance is estimated to be a long distance, control is for example performed such that the resonant frequency is higher (for example, 14.2 MHz) than the initial value thereof and such that the resistance value of the load resistance RL is the initial value thereof (i.e., the resistance value RA).

Once the sensing period described above is complete, the reception device 20 transitions to a normal mode (i.e., a communication period starts). The sensing period is for example a period of approximately 50 μs to 100 μs in length.

According to the present embodiment described above, the reception device 20 includes: the antenna section 21 that includes the resonant circuit 212 including the antenna 211 that is configured to receive electrical power from the transmission device 10 through contactless communication; and the control section 31 that is configured to change the Q factor of the resonant circuit 212 and control an antenna characteristic of the antenna section 21 in accordance with a change in received electrical power before and after changing of the Q factor.

Since the gradient Δ of the change in received electrical power that accompanies the change in the Q factor differs in accordance with the communication distance (long distance (kQ>1), medium distance (kQ=1), or short distance (kQ<1)), the communication distance can be estimated in accordance with the change in received electrical power before and after changing of the Q factor. Furthermore, by controlling the antenna characteristic of the antenna section 21 in accordance with the estimated communication distance, the antenna characteristic can be optimized in accordance with the communication distance and communication characteristics can be improved regardless of the communication distance.

Moreover, since the communication distance is estimated from the polarity of the gradient Δ in the present embodiment, a simple determination can be made without the need for a complicated configuration or process for estimating the communication distance and, as a consequence, any increase in cost can be limited.

In the present embodiment, the communication distance can be estimated through detection of just the induced voltage in the reception device 20 and the resistance value of the load resistance RL (or the current flowing in the load resistance RL (load current IL)). Therefore, it is only necessary to monitor a small number of targets and any increase in cost can be limited. Furthermore, in a situation in which the present disclosure is implemented using an LSI, any increase in the number of pins that are added to the LSI can be limited.

In the present embodiment, the Q factor of the resonant circuit 212 is changed by changing the resistance value of a resistance connected to the antenna 211. Therefore, there is no need for a complicated configuration or process in order to change the Q factor of the resonant circuit 212 and, as a consequence, any increase in cost can be limited.

It should be appreciated that although the present disclosure is explained based on the drawings and embodiments, a person of ordinary skill in the technical field would easily be able to make various alterations and revisions based on the present disclosure. Therefore, such alterations and revisions should also be considered to be included within the scope of the present disclosure.

The invention claimed is:

1. A reception device comprising:
an antenna section that includes a resonant circuit including an antenna configured to receive electrical power from a transmission device through contactless communication; and
a control section that is configured to change a Q factor of the resonant circuit and control an antenna characteristic of the antenna section in accordance with a change in received electrical power before and after changing of the Q factor.

2. The reception device of claim 1, wherein
the control section changes the Q factor of the resonant circuit by changing a resistance value of a resistance that is electrically connected to the antenna.

3. The reception device of claim 1, wherein
the control section changes the Q factor of the resonant circuit from a first Q factor to a second Q factor and controls the antenna characteristic of the antenna section in accordance with polarity of a difference between first received electrical power that is electrical power received when the Q factor of the resonant circuit is the first Q factor and second received electrical power that is electrical power received when the Q factor of the resonant circuit is the second Q factor.

4. The reception device of claim 3, wherein
the first Q factor is a specific value that is set when the reception device and the transmission device perform contactless communication, and
the second Q factor is a larger value than the first Q factor.

5. The reception device of claim 3, wherein
when the difference between the first received electrical power and the second received electrical power is a positive value, the control section controls the antenna characteristic of the antenna section such as to become an antenna characteristic that is suitable for a situation in which a communication distance between the transmission device and the reception device is a first distance, and when the difference between the first received electrical power and the second received electrical power is a non-positive value, the control section controls the antenna characteristic of the antenna section such as to become an antenna characteristic that is suitable for a situation in which the communication distance is a second distance that is shorter than the first distance.

6. The reception device of claim 5, wherein
when the difference between the first received electrical power and the second received electrical power is a non-positive value, and is greater than a specific threshold value that is a negative value, the control section controls the antenna characteristic of the antenna section such as to become an antenna characteristic that is suitable for a situation in which the communication distance is a third distance that is shorter than the first distance and longer than the second distance.

7. The reception device of claim 2, wherein
the control section changes the resistance value of the resistance such that a difference between received electrical power before and after changing of the Q factor becomes a non-positive value, and becomes greater than a specific threshold value that is a negative value.

8. A control method for a reception device including an antenna section that includes a resonant circuit including an antenna that is configured to receive electrical power from a transmission device through contactless communication, the control method comprising:
changing a Q factor of the resonant circuit; and
controlling an antenna characteristic of the antenna section in accordance with a change in received electrical power before and after changing of the Q factor.

9. The control method of claim 8, wherein
in the changing, the Q factor of the resonant circuit is changed by changing a resistance value of a resistance that is electrically connected to the antenna.

10. The control method of claim 8, wherein
in the changing, the Q factor of the resonant circuit is changed from a first Q factor to a second Q factor, and
in the controlling, the antenna characteristic of the antenna section is controlled in accordance with polarity of a difference between first received electrical power that is electrical power received when the Q factor of the resonant circuit is the first Q factor and second received electrical power that is electrical power received when the Q factor of the resonant circuit is the second Q factor.

11. The control method of claim 10, wherein
the first Q factor is a specific value that is set when the reception device and the transmission device perform contactless communication, and
the second Q factor is a larger value than the first Q factor.

12. The control method of claim 10, wherein
in the controlling, when the difference between the first received electrical power and the second received electrical power is a positive value, the antenna characteristic of the antenna section is controlled such as to become an antenna characteristic that is suitable for a situation in which a communication distance between the transmission device and the reception device is a first distance, and when the difference between the first received electrical power and the second received electrical power is a non-positive value, the antenna characteristic of the antenna section is controlled such as to become an antenna characteristic that is suitable for a situation in which the communication distance is a second distance that is shorter than the first distance.

13. The control method of claim 12, wherein
in the controlling, when the difference between the first received electrical power and the second received electrical power is a non-positive value, and is greater than a specific threshold value that is a negative value, the antenna characteristic of the antenna section is controlled such as to become an antenna characteristic that is suitable for a situation in which the communication distance is a third distance that is shorter than the first distance and longer than the second distance.

14. The control method of claim 9, wherein
in the controlling, the resistance value of the resistance is changed such that a difference between received electrical power before and after changing of the Q factor becomes a non-positive value, and becomes greater than a specific threshold value that is a negative value.

* * * * *